US007912696B1

(12) United States Patent
Asano et al.

(10) Patent No.: US 7,912,696 B1
(45) Date of Patent: Mar. 22, 2011

(54) NATURAL LANGUAGE PROCESSING APPARATUS AND NATURAL LANGUAGE PROCESSING METHOD

(75) Inventors: Yasuharu Asano, Kanagawa (JP); Atsuo Hiroe, Tokyo (JP); Masato Shimakawa, Kanagawa (JP); Tetsuya Kagami, Chiba (JP); Erika Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/530,200

(22) PCT Filed: Aug. 31, 1999

(86) PCT No.: PCT/JP99/04726
§ 371 (c)(1),
(2), (4) Date: May 15, 2000

(87) PCT Pub. No.: WO00/13102
PCT Pub. Date: Mar. 9, 2000

(30) Foreign Application Priority Data

Aug. 31, 1998 (JP) .................................... 10 246400

(51) Int. Cl.
*G06F 17/28* (2006.01)
(52) U.S. Cl. ................. 704/2; 704/8; 704/231; 704/251
(58) Field of Classification Search ................. 704/1, 2, 704/3, 9, 235, 8, 231, 251
See application file for complete search history.

(56) References Cited

U.S. PATENT DOCUMENTS

| 4,984,177 | A | * | 1/1991 | Rondel et al. ................. 704/277 |
| 5,222,160 | A | * | 6/1993 | Sakai et al. .................... 382/185 |
| 5,285,386 | A | * | 2/1994 | Kuo .................................. 704/2 |
| 5,541,837 | A | * | 7/1996 | Fushimoto ........................ 704/2 |
| 5,652,896 | A | * | 7/1997 | Yamauchi et al. ................ 704/2 |
| 5,768,603 | A | * | 6/1998 | Brown et al. ..................... 704/9 |
| 5,963,892 | A | * | 10/1999 | Tanaka et al. ..................... 704/2 |
| 5,966,685 | A | * | 10/1999 | Flanagan et al. ................. 704/8 |
| 6,085,162 | A | * | 7/2000 | Cherny ......................... 704/277 |
| 6,154,720 | A | * | 11/2000 | Onishi et al. ...................... 704/2 |
| 6,182,026 | B1 | * | 1/2001 | Tillmann et al. .................. 704/2 |

FOREIGN PATENT DOCUMENTS

| JP | 03-282776 | * | 12/1991 |
| JP | 3-282776 | | 12/1991 |
| JP | 04-153878 | * | 5/1992 |
| JP | 4-153878 | | 5/1992 |
| JP | 4-205464 | | 7/1992 |
| JP | 5-197744 | | 8/1993 |
| JP | 06-052219 | | 2/1994 |
| JP | 6-52219 | | 2/1994 |
| JP | 9-269945 | | 10/1997 |

* cited by examiner

*Primary Examiner* — David R Hudspeth
*Assistant Examiner* — Lamont M Spooner
(74) *Attorney, Agent, or Firm* — K&L Gates LLP

(57) ABSTRACT

A natural language processing apparatus includes an input section for inputting natural language, a representation converting section for converting representation of the natural language, a display section for displaying, for confirmation, sentence converted at the representation converting section, a machine translation section for carrying out machine translation of the confirmed sentence, and a control section for controlling these respective sections, thus to provide natural language processing in which confirmation operation of user is reduced.

25 Claims, 21 Drawing Sheets

1. (JAPANESE) X[MATERIAL] O KUDASAI
   (ENGLISH) X PLEASE.

2. (JAPANESE) WATASHI WA X[PLACE] NI IKITAI
   (ENGLISH) I WANT TO GO TO X.

3. (JAPANESE) X[MATERIAL] O Y[PERSON] NI MISETE KUDASAI
   (ENGLISH) WOULD YOU SHOW Y X ?

4. (JAPANESE) S1[SENTENCE] SHIKASHI S2[SENTENCE]
   (ENGLISH) S1, BUT S2.

5. (JAPANESE) S1[SENTENCE] SOSHITE S2[SENTENCE]
   ENGLISH) S1, AND S2.

6. (JAPANESE) S1[SENTENCE] DAKARA S2[SENTENCE]
   (ENGLISH) S1, SO S2.

7. (JAPANESE) SUIMASEN (=ARIGATO)
   (ENGLISH) THANK YOU.

8. (JAPANESE) SUIMASEN (=AYAMARU)
   (ENGLISH) I'M SORRY.

9. (JAPANESE) SUIMASEN (=YOBIKAKE)
   (ENGLISH) EXCUSE ME.

10. (JAPANESE) X[PERSON] GA Y[VEHICLE] O TSUKAU
    (=X GA Y NI NORU)
    (ENGLISH) X GO BY Y.

11. (JAPANESE) X[PERSON] GA Y O TSUKAU
    (=X GA Y O SYOHI SURU)
    (ENGLISH) X CONSUME Y.

FIG.3

| JAPANESE | ENGLISH | ATTRIBUTE |
|---|---|---|
| WATASHI<br>RINGO<br>LONDON<br>BAGGU | I<br>APPLE<br>LONDON<br>BAG | PERSON<br>MATERIAL<br>PLACE<br>MATERIAL |

FIG.4

| BEFORE CONVERSION | AFTER CONVERSION |
|---|---|
| (CONVERSION RULE FOR SENTENCE END) | |
| ~SHITE MORAE MASENKA | ~SHITE KUDASAI |
| ~TE ITADAKENAIDESHOKA | ~SHITE KUDASAI |
| ~TAI NO DESU | ~SHITAI |
| ~TAI NO DESUGA | ~SHITAI |
| (RULE FOR DISSOLVING COMPOUND SENTENCE) | |
| ~GA [CONJUNCTION POSTPOSITIONAL WORD] ~ | ~。SHIKASI、~ |
| ~GA [CONJUNCTION POSTPOSITIONAL WORD] ~ | ~。SOSHITE、~ |
| ~GA [CONJUNCTION POSTPOSITIONAL WORD] ~ | ~。DAKARA、~ |
| ~ TE ~ | ~。DAKARA、~ |
| ~ TE ~ | ~。SOSHITE、~ |
| ~ TE ~ | ~。SHIKASI、~ |
| (RULE FOR POLYSEMOUS EXPRESSION) | |
| SUIMASEN | SUIMASEN (=ARIGATOU) |
| SUIMASEN | SUIMASEN (=AYAMARU) |
| SUIMASEN | SUIMASEN (=YOBIKAKE) |
| X O TSUKAU | X O TSUKAU (=X NI NORU) |
| X O TSUKAU | X O TSUKAU (=X O SHOHISURU) |
| (SHORTAGE ELEMENT SUPPLEMENT RULE) | |
| MISETE KUDASAI | (KOREO) MISETE KUDASAI |
| MISETE KUDASAI | (SOREO) MISETE KUDASAI |
| MISETE KUDASAI | (AREO) MISETE KUDASAI |
| X O MISETE KUDASAI | X O (WATASHI NI) MISETE KUDASAI |
| (ORDER EXCHANGE RULE) | |
| Y O X GA | X GA Y O |
| Y NI X GA | X GA Y NI |
| X GA Z O Y NI | X GA Y NI Z O |
| Y NI X GA Z O | X GA Y NI Z O |
| Y NI Z O X GA | X GA Y NI Z O |
| Z O X GA Y NI | X GA Y NI Z O |
| Z O Y NI X GA | X GA Y NI Z O |

FIG.5

| ORIGINAL LANGUAGE | OBJECTIVE LANGUAGE | CHANGE OF EXPRESSION WITHIN ORIGINAL LANGUAGE |
|---|---|---|
| [CHANGE OF EXPRESSION FOR POLYSEMOUS WORD] | | |
| 1. SUIMASEN | I'M SORRY. | SUIMASEN (=AYAMARU) |
| 2. SUIMASEN | THANK YOU. | SUIMASEN (=ARIGATO) |
| 3. SUIMASEN | EXCUSE ME. | SUIMASEN (=YOBIKAKE) |
| 4. X GA Y O TSUKAU | X USE Y. | (NO CHANGE OF EXPRESSION) |
| 5. X GA Y O TSUKAU | X GO BY Y. | X GA Y DE IKU. |
| 6. X GA Y O TSUKAU | X CONSUME Y. | XGA Y O SHOHI SURU. |
| [SHORTAGE ELEMENT SUPPLEMENT] | | |
| 7. X O TSUKAU | I USE Y. | WATASHI WA X O TSUKAU. |
| 8. X O TSUKAU | I GO BY Y. | WATASHI WA X DE IKU. |
| 9. X O TSUKAU | I CONSUME Y. | WATASHI WA X O SHOHI SURU |
| 10. X O MISETE KUDASAI | PLEASE SHOW ME X. | X O WATASHI NI MISETE KUDASAI |
| [COMPOUND SENTENCE DEVELOPMENT] | | |
| 11. S1 GA, S2 | S1, BUT S2. | S1, SHIKASI S2. |
| 12. S1 GA, S2 | S1, AND S2. | S1, SOSHITE S2. |
| 13. S1 GA, S2 | S1, S2. | S1, S2. |

FIG.13

| ORIGINAL LANGUAGE | OBJECTIVE LANGUAGE | CHANGE OF EXPRESSION WITHIN ORIGINAL LANGUAGE | COMMENT |
|---|---|---|---|
| [CHANGE OF EXPRESSION FOR POLYSEMOUS WORD] | | | |
| 1. SUIMASEN | I'M SORRY. | | REPRESENTATION AT THE TIME OF APOLOGY |
| 2. SUIMASEN | THANK YOU. | | REPRESENTATION OF THANKS |
| 3. SUIMASEN | EXCUSE ME. | | REPRESENTATION OF CALLING |
| 4. X GA Y O TSUKAU | X USE Y. | | |
| 5. X GA Y O TSUKAU | X GO BY Y. | X GA Y DE IKU. | |
| 6. X GA Y O TSUKAU | X CONSUME Y. | X GA Y O SHOHI SURU. | |
| [SHORTAGE ELEMENT SUPPLEMENT] | | | |
| 7. X O TSUKAU | I USE Y. | WATASHI WA X O TSUKAU. | |
| 8. X O TSUKAU | I GO BY Y. | WATASHI WA X DE IKU. | |
| 9. X O TSUKAU | I CONSUME Y. | WATASHI WA X O SHOHI SURU | |
| 10. X O MISETE KUDASAI | PLEASE SHOW ME X. | X O WATASHI NI MISETE KUDASAI | |
| [COMPOUND SENTENCE DEVELOPMENT] | | | |
| 11. S1 GA, S2 | S1, BUT S2. | S1, SHIKASI S2. | EXPRESSION OF NEGATIVE CONJUNCTION |
| 12. S1 GA, S2 | S1, AND S2. | S1, SOSHITE S2. | EXPRESSION OF AFFIRMATIVE CONJUNCTION |
| 13. S1 GA, S2 | S1, S2. | S1, S2. | EXPRESSION OF PARALLEL |

FIG.16

INPUT : "SUIMASEN"

1) (CHANGE OF EXPRESSION)   SUIMASEN (COMMENT)   REPRESENTATION AT THE TIME OF APOLOGY (TRANSLATION INTO ENGLISH)   I'M SORRY.

2) (CHANGE OF EXPRESSION)   SUIMASEN (COMMENT)   REPRESENTATION OF THANKS (TRANSLATION INTO ENGLISH)   THANK YOU.

3) (CHANGE OF EXPRESSION)   SUIMASEN (COMMENT)   REPRESENTATION OF CALLING (TRANSLATION INTO ENGLISH)   EXCUSE ME.

FIG.17

INPUT : "~GA, ~ "

1) (CHANGE OF EXPRESSION)     ~。 SHIKASHI ~。

(COMMENT)     EXPRESSION OF NEGATIVE CONJUNCTION (TRANSLATION INTO ENGLISH)     ~, BUT ~.

2) (CHANGE OF EXPRESSION)     ~。 SOSHITE ~。

(COMMENT)     EXPRESSION OF AFFIRMATIVE CONJUNCTION (TRANSLATION INTO ENGLISH)     ~, AND ~.

3) (CHANGE OF EXPRESSION)     ~。 ~。

(COMMENT)     EXPRESSION OF PARALLEL (TRANSLATION INTO ENGLISH)     ~, ~.

FIG.18

NATURAL LANGUAGE PROCESSING APPARATUS AND NATURAL LANGUAGE PROCESSING METHOD

TECHNICAL FIELD

This invention relates to a natural language processing apparatus and a natural language processing method for processing natural language, and more particularly to a natural language processing apparatus and a natural language processing method which simplify selection/confirmation by user in the process of processing.

BACKGROUND ART

Hitherto, various systems utilizing natural language processing such as automatic translation, voice recognition, document retrieval and document processing, etc. have been put into practical use.

There is shown in FIG. 1 flowchart of outline of processing procedure of a voice translation apparatus according to the prior art as an example of the conventional system.

In the processing procedure of this voice translation apparatus, voice input of step S101 is caused to undergo voice recognition at step S102. Result of that voice recognition is confirmed by user at step S103. When result of voice recognition is recognized by user, recognition result is subjected to machine translation at step S104. If otherwise, processing returns to the step S101 to execute voice recognition for a second time.

Result of machine translation of the step S104 is caused to undergo confirmation by user at step S105. If necessary, editing is implemented thereto at step S106. Synthetic voice (speech) is generated at the last step 107. Thus, this processing procedure is completed.

At stated above, at step S101, user first inputs, to a voice translation unit, conversation that he intends by voice. The voice translation unit carries out recognition of voice inputted at step S102 to display its result. Since erroneous recognition could take place in the voice recognition processing, a processing such that user confirms recognition result is frequently carried out.

As a method of confirming recognition result at step S103, there have been frequently used a method of displaying plural higher rank candidates which have indicated high score in the recognition processing to allow user to select desired one among them, and the like. In the case where sentence that user himself has said is not included in the sentences displayed, sound input is carried out for a second time. When the sentence that user has carried out voice input is decided or established by confirmation of user, that sentence is translated into objective language in turn at step S104.

Since there is the possibility that result including error may be outputted also in the translation processing, there is carried out such a work that user confirms translation result at step S105 for the purpose of maintaining translation accuracy. Further, in the case where translation result is not suitable, editing into representation of suitable objective language is carried out at step S106.

In addition, synthetic voice is generated from translation result and is outputted at step S106. Thus, processing procedure of this voice recognition is completed.

However, in conventional systems utilizing natural language processing, it cannot be said that interface suitable for user is prepared or arranged. For example, in the case of the voice translation unit thus constituted, there are two problems as described below.

First problem is variety of natural languages to be handled and processing accuracy. In the present machine translation, it is very difficult to translate various input sentences with high accuracy. In general, in the machine translation, there exists the problem that according as various sentence styles are handled as input sentences of original or source language, accuracy of translation is lowered to more degree. On the other hand, while restriction is given to sentence style or vocabulary of input sentence, etc., thereby making it possible to improve accuracy of translation, compelling of such input with restriction becomes burden on user. In addition, in the case where there exist polysemy such as meaning or relationship of modification or circumstance dependency, etc. in the input sentence, there generally exist plural results that such input sentence is translated.

In order to univocally specify this, there may be employed either an approach to automatically select suitable candidate on the translation unit side, or an approach to select that candidate by user. However, the former has the problem that erroneous candidate may be selected, and the latter has the problem that it is difficult to select that candidate if user is not familiar with the objective language. In this case, as application of the latter, there may be employed a method of translating translation result into original language for a second tune to present that re-translation result to user to thereby allow him to carry out selection/confirmation. However, there may take place error in the process of re-translation. In addition, in place of presenting translation result, in a method of presenting internal representation of sentence structure tree, etc. or log of process of translation processing, etc., user must know way of finding. Accordingly, selection/confirmation by user is difficult.

The problem applies not only to machine translation processing, but also to all apparatuses utilizing natural language processing such as data base retrieval and/or representation support, etc. by natural language.

The second problem is confirmation work of user. When the processing procedure is viewed from viewpoints of confirmation work of user, user is required to twice carry out confirmation works of result of voice recognition and result of machine translation. Thus, the number of confirmation operations is large. Such a work is troublesome.

This generally applies to systems in which plural modules utilizing natural language processing are combined. For example, let now consider the case where an approach is employed to input Japanese by using kana-kanji conversion to translate it into English by using machine translation. User inputs Japanese sentence by kana to confirm converted Chinese character (kanji) to first generate correct Japanese sentence in which correct kanas and kanjis are mixed. Then, Japanese-English translation is carried out with that Japanese sentence being as input, and user confirms that result for a second time.

In addition, in the case of machine translation, there is the problem that when user is not familiar with objective language, it is very difficult to confirm translated result.

DISCLOSURE OF THE INVENTION

This invention has been made in view of actual circumstances as described above, and its object is to provide such a natural language processing apparatus and such a natural language processing method to maintain processing accuracy and to reduce confirmation work.

A natural language processing apparatus according to this invention includes input means for inputting natural language, conversion means for converting the natural language inputted by the input means, confirmation means for confirming the natural language converted by the conversion means, processing means for implementing processing to the natural language confirmed by the confirmation means, and output means for outputting the natural language processed by the processing means.

Moreover, a natural language processing apparatus according to this invention includes input means for inputting natural language, one processing means, or two processing means or more for implementing processing to the natural language, one confirmation means, or two confirmation means or more for confirming result of processing with respect to the natural language, and output means for outputting the processed natural language, wherein result processed in order of first processing means and first confirmation means for confirming its result is used, the natural processing apparatus being such that there are provided, at the preceding stage of the first processing means, second processing means for converting natural language inputted to the input means into such a form to have ability to process it, with high accuracy, and second confirmation means for confirming result of the second processing means to thereby carry out execution in advance of confirmation to omit confirmation of result of the first processing means.

Further, a natural language processing apparatus according to this invention includes input means for inputting natural language, conversion means for converting first language inputted to the input means into representation having one-to-one correspondence with respect to representation of second language by representation by the second language and representation by third language, confirmation means for confirming the representation of the third language converted by the conversion means, processing means for implementing processing to the natural language inputted by the input means in dependency upon result of confirmation at the confirmation means, and output means for outputting the natural language processed by the processing means.

A natural language processing method according to this invention includes an input step of inputting natural language, a conversion step of converting the natural language inputted at the input step, a confirmation step of confirming the natural language converted at the conversion step, a processing step of implementing processing to the natural language confirmed at the confirmation step, and an output step of outputting language processed at the natural language processing step.

Moreover, a natural language processing method according to this invention includes an input step of inputting natural language, one processing step, or two processing steps or more of implementing processing to the natural language, one confirmation step, or two confirmation steps or more of confirming result of processing with respect to the natural language, and an output step of outputting the natural language thus processed, wherein result processed in order of the first processing step and first confirmation step to confirm its result is used, the natural language processing method being such that there are provided, at the preceding stage of the first processing step, a second processing step of converting the natural language inputted at the input step into such a form to have ability to process it with good accuracy and a second confirmation step of confirming the result of the second processing step to thereby carry out execution in advance of confirmation to omit confirmation of result of the first processing step.

Further, a natural language processing method according to this invention includes an input step of inputting natural language, a conversion step of converting first language inputted at the input step into representation having one-to-one correspondence with respect to representation by second language by representation by the second language and representation by third language, a confirmation step of confirming representation of the third language converted at the conversion step, a processing step of implementing processing to natural language inputted at the input means in accordance with result of confirmation at the confirmation step, and an output step of outputting natural language processed at the processing step.

As stated above, in this invention, without directly applying natural language processing to sentence (also including phrase and clause in addition to sentence, which applies to the following description) that user has inputted, "representation conversion processing" and "confirmation/selection wait (standby)" are added therebetween. Alternatively, the above-mentioned natural language processing and representation conversion processing are carried out at the same time and confirmation /selection is carried out with respect to "pair of natural language processing result and representation conversion processing result" thus generated. Namely, there is carried out representation conversion processing to convert input sentence into such a sentence to have ability to execute subsequent natural language processing with good accuracy so as to become close to intention of user. In place of carrying out representation conversion processing before machine translation processing, machine translation processing may be also carried out at the same time.

Between "information/selection wait (standby)" and "machine translation", "re-conversion processing" may be added. In this processing, there is only carried out conversion to exchange, etc. word order of a partial sentence which does not change meaning or nuance of sentence within the "representation conversion". Thus, it is possible to provide sentence relatively close to input sentence presented to user, and to provide sentence suitable for processing with respect to translation processing.

Further, the representation translation conversion processing may be carried out simultaneously with machine translation processing in place of carrying out it before machine translation processing. In this case, such an approach is employed to prepare corresponding representation conversion processing every translation processing to also apply corresponding representation conversion processing when a certain translation processing is applied to a certain sentence. When such an approach is employed, translation result and representation conversion processing are generated as a pair. Further, "confirmation/selection" is carried out by presenting only corresponding pair or representation conversion result.

In addition, this invention classifies processing into processing in which accuracy can be guaranteed and processing in which accuracy cannot be guaranteed to collectively carry out processing of the portion in which accuracy cannot be guaranteed even with respect to processing over plural functional modules thereafter to carry out confirmation work of user to thereby lessen (reduce) the number of confirmation operations of user. Namely, in the above-mentioned processing procedure, without employing a method of carrying out machine translation after result of voice recognition is established, an approach is employed to carry out machine translation processing while holding plural possibilities as result of voice recognition so that user confirms only its result.

BRIEF DESCRIPTION OF THE DRAWINGS

FIG. 3 is a view showing an example of template.

FIG. 4 is a view showing equivalent or bilingual dictionary.

FIG. 5 is a view showing an example of representation conversion rule.

FIG. 13 is a view showing example of equivalent or bilingual template.

FIG. 16 is a view showing an example of template to which comment is added.

FIG. 17 is a view showing an example of output with respect to input "suimasen".

FIG. 18 is a view showing an example of output with respect to input "~ga,~".

BEST MODE FOR CARRYING OUT THE INVENTION

Preferred examples of the configuration according to this invention will be described below with reference to the attached drawings.

Explanation will be first given in connection with a translation apparatus (unit) for carrying out machine translation utilizing natural language processing as a first embodiment of this invention.

Figure 1:
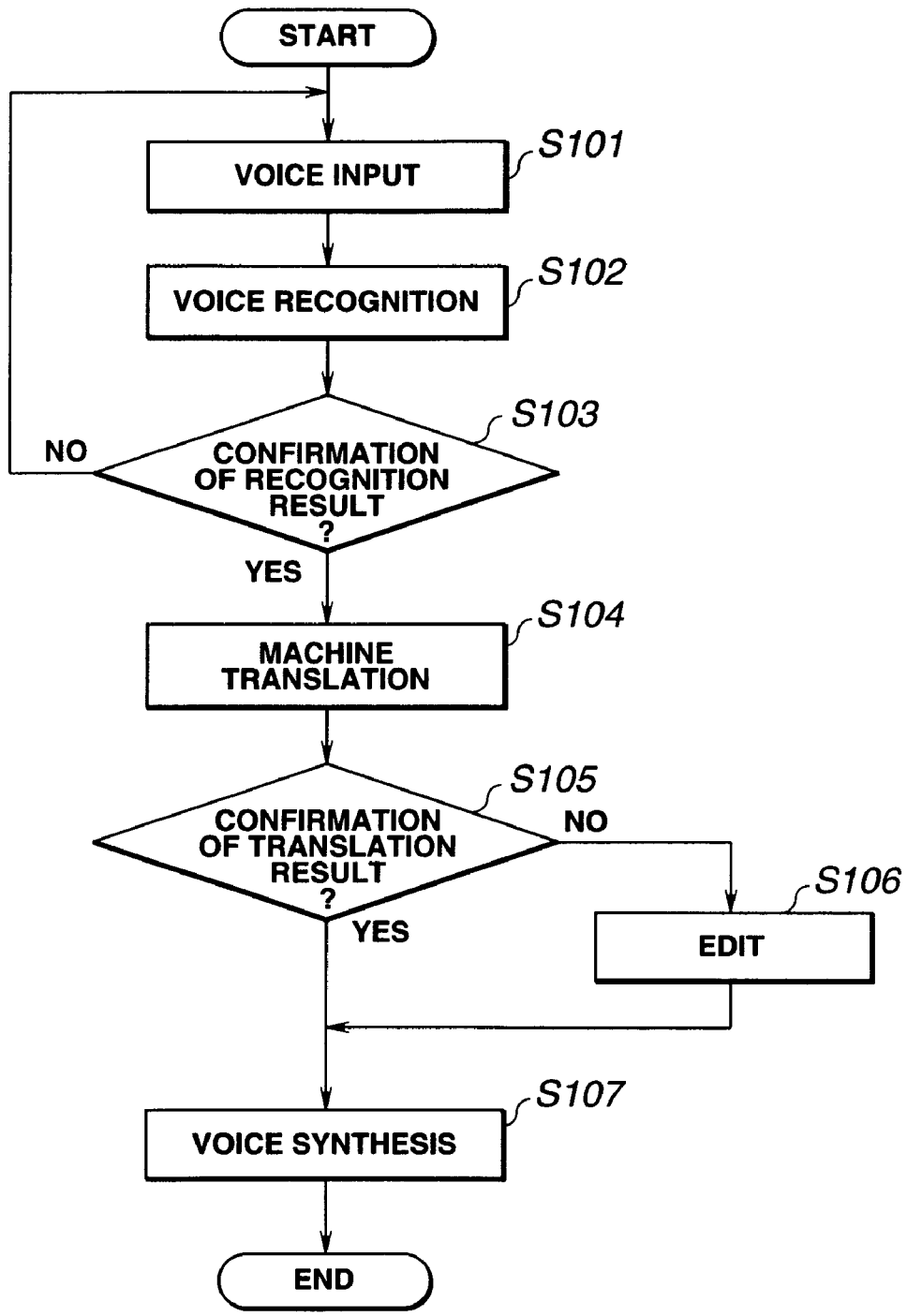
FIG. 1 is a flowchart of outline of processing procedure of a voice translation apparatus (unit) according to the prior art.
Figure 2:
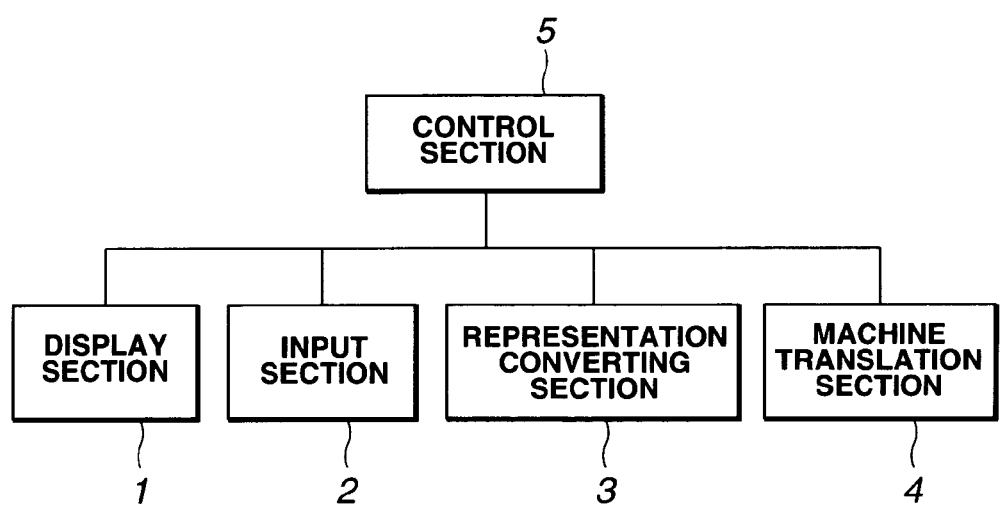
FIG. 2 is a block diagram showing outline of the configuration of the translation unit.

The translation unit is composed of, as shown in FIG. 2, a display section 1 for displaying result of representation conversion/machine translation, etc., an input section 2 for accepting (receiving) input, a representation converting section 3 for converting form of representation, a machine translation section 4 for carrying out conversion into other language, and a control section 5 for controlling respective sections of this translation unit.

The display section 1 is comprised of, e.g., liquid crystal display, etc. and serves to display representation conversion/machine translation, etc. on the basis of command of the control section.

The input section 2 is comprised of, e.g., plural button switches or touch panels, etc. User carries out, by utilizing them, selection from information displayed on the display section 1 and/or menu selection with respect to the operation of the system. Moreover, the input section 2 also accepts input of sentence to be translated. Thus, the input section 2 transmits result of input by user to the control section 5.

The representation converting section 3 is composed of, e.g., CPU, ROM, RAM, etc. The representation converting section 3 receives result of input applied to the input section 2 by user through the control section 5. Further, the representation conversion section 3 converts result of input received from the control section 5 into data of form such that it can be handled at the machine translation section 4. The representation converting section 3 transmits the converted result to the control section 5.

The machine translation section 4 is composed of, e.g., CPU, ROM, RAM, etc., similarly to the representation converting section 3. The machine translation section 4 receives result of conversion by the representation converting section 3 through the control section 5. The machine translation section 4 translates converted result received from the control section 5 into other language. Further, the machine translation section 4 transmits result translated into other language to the control section 5.

The control section 5 is also composed of, e.g., CPU, ROM, RAM, etc. similarly to the representation converting section 3 and the machine translation section 4. The control section 5 carries out, e.g., such a data transmitting control to transmit data inputted to the input section 2 to the representation converting section 3 to transmit converted result from the representation converting section 3 to the machine translation section 4. In addition, the control section 5 carries out control by control signals with respect to respective portions of this translation unit.

It is to be noted that, in addition to the fact that the representation converting section 3, the machine translation section 4 and the control section 5 are independently constituted as described above, they may be constituted as functional blocks within the control block constituted by the same CPU, ROM, RAM.

Machine translation utilizing natural language in this translation unit will now be described.

In this translation unit, restrictions with respect to the method of translation, original language which is language before translation and objective language which is language after translation are not particularly made. However, in the following description, as the translation system, there is employed a system in which bilingual or equivalent template is used and phrases on the template are exchanged to thereby generate translated result. In addition, Japanese is employed as original language and English is employed as objective language.

The bilingual template consists of Japanese portion and portion translated into English. In the example of the bilingual template shown in FIG. 3, "X please" corresponds to "X (material) o kudasai". "I want to go to X." corresponds to "Watashi wa X [place] ni ikitai". "Would you show Y X?" corresponds to "X (material) o Y [person] ni misete kudasai".

"S1, but S2" corresponds to "S1 [sentence] shikashi S2 sentence". "S1, and S2." corresponds to S1 [sentence] soshite S2 [sentence]". "S1. So S2." corresponds to "S1 [sentence] dakara sS2. "Thank you." corresponds to "suimasen (=arigato)". "I'm sorry." corresponds to suimasen (=ayamaru)", "Excuse me" corresponds to suimasen (yobikake)". "X go by Y." corresponds to X (person) ga Y(vehicle) o tsukau" "X consume Y." corresponds to "X [person] ga Y o tsukau (=X ga Y o shohi suru)".

In the bilingual or equivalent template, the Japanese portion is sentence, phrase, clause or, word of the Japanese. It is to be noted that sentence, phrase, clause and word will be called sentence for simplicity in the following description. A portion of the Japanese portion can be also represented by parameter (variable), and attribute in which that parameter (variable) should be satisfied can be also designated. For example, in "X(material) o kudasai" of 1 of FIG. 3, X of "X(material)" is parameter (variable), and phrase having attribute of "material" can be substituted. Attributes of respective phrases are assumed to be described in the bilingual dictionary which will be described later.

The English translated portion of the bilingual template is bilingual or equivalent translation of the Japanese portion. In the case where variable is included in the Japanese portion, the English portion also includes variable in corresponding portion. Since, e.g., "X (material) o kudasai" of the Japanese portion of 1 of FIG. 3 includes variable, the portion translated into English "X please." also includes variable in corresponding portion.

In the bilingual or equivalent dictionary, phrase of Japanese, phrase of English corresponding thereto and attribute to be satisfied are described. As an example of the equivalent (bilingual) dictionary, as shown in FIG. 4, there is mentioned a dictionary such that English "I" and attribute "person" correspond to the Japanese "Watashi", English "apple" and attribute "material" correspond to the Japanese "ringo", English "London" and attribute "place" correspond to Japanese "London", and English "bag" and attribute "material" correspond to Japanese "baggu".

Processing of representation conversion in the representation converting section 3 will now be described.

The representation converting section 3 receives, through the control section 5, sentence that user has inputted to the input section 2. Further, representation of this sentence is converted so that it can be translated with good accuracy. In this embodiment, the representation converting portion 3 converts, within Japanese, sentence that user has inputted by the Japanese so that the Japanese is matched with the Japanese portion of the equivalent (bilingual) template.

As conversion in the representation converting section 3, in addition to one-to-one conversion, m-to-one conversion and 1- to-n conversion, and n-to-m conversion in which these conversions are combined are also conceivable.

In this instance, one-to-one conversion is conversion in which one conversion result exists with respect to one input sentence. Moreover, m-to-1 conversion is conversion in which one conversion result exists with respect to in number of input sentences. Further, one-to-n conversion is conversion in which n number of conversion results exist with respect to one input sentence.

In addition, as conversion of representation, merger (integration), division, insertion, deletion, replacement, exchange of order are conceivable in general.

As stated above, since the representation conversion rule is based on the premise that user is caused to carry out selection/confirmation after conversion, there may be plural candidates after conversion, and such a conversion that nuance is changed to some extent may be employed.

Subsequently, explanation will be given in connection with, as main conversion rule, conversion rule for sentence end, rule for dissolving compound sentence, rule for polysemous expression, shortage element supplement rule, and order exchange rule.

In the case where plural expressions exist with respect to one intention, i.e., sentence mainly end representations are mainly different, the conversion rule for sentence end is the rule for allowing these plural expressions to correspond to single expression.

As the sentence end conversion rule, in the case where, e.g., request (order) is given by the Japanese, plural expressions "shite kudasai", "shite moraemasenka", "shite itadakenaideshoka" and "shitehoshinodesuga" are replaced by single expression of "shitekudasai". This is the example where replacement is carried out by the above-described conversion of in to 1.

According to the conversion rule of FIG. 5, as sentence end conversion rule, "~shitekudasai" corresponds to "~te moraemasenka", "~shite kudasai" corresponds to "~te itadakenaide shoka", "~tai" corresponds "~tai no desu", and "~tai" corresponds to "~tai nodesuga".

With respect to compound sentence dissolution rule, since there exist polysemous sentences in dependency upon conjunction post positional word or conjunction, plural alternate portions replaced by univocal conjunction are generated in such a case. The compound sentence dissolution rule is the example in which division is carried out by the above-described conversion of 1 to n. As polysemous compound sentence, e.g., "~ga, ~" may be affirmative conjunction or negative conjunction.

In accordance with the conversion rule of FIG. 5, as compound sentence conversion rule, "$\sim_o$ shikashi,~" correspond to "~ga (conjunction post positional word)~". "$\sim_o$ soshite," corresponds to "~ga (conjunction post positional word)~", "~dakara o~," corresponds to "~ga (conjunction post positional word)~" "$\sim_o$ dakara~" corresponds to "~te~" "~soshite~" corresponds to "~te~", and "$\sim_o$ shikashi~" corresponds to "~te~".

In the rule for polysemous expression of sentence, polysemous expression generates plural candidates replaced by univocal expression. This is the example where replacement is carried out by conversion of 1 to n. As polysemous expression, e.g., "suimasen" is used when thanks are said, when other person is called, and when apology is made.

In accordance with the conversion rule of FIG. 5, as rule for polysemous expression, "suimasen (=arigato)" correspond to "suimasen", "suimasen (ayamaru) corresponds to "suimasen", "suimasen (=yobikake)" corresponds to "suimasen", "X tsukau (=X ni noru)" corresponds to "x o tsukau", and "X o tsukau (=X o shohi sum)" corresponds to "X o tsukau".

The shortage element supplementary rule is the rule for supplementing elements in the case where such element short when translation into English is made is applied to input sentence. For example, this rule is a rule such that when "koreo misete kudasai" is translated, "watashi ni" is supplemented. Defaults of phrase to be supplemented are described in, e.g., bilingual or equivalent template. This is the example where insertion is carried out.

In accordance with the conversion rule of FIG. 5, as shortage element supplementary rule, "(kore o) misete kudasai" corresponds to "misete kudasai", "(areo o) misete kudasai" corresponds to "misete kudasai", and (sore o) misete kudasai" corresponds to "misete kudasai".

The order exchange rule is the rule for exchanging word order within the range where meaning is not changed. For example, in the case where input sentence is "sore o watashi ni kudasai" and "X o Y ni kudasai" is described on the template, "sore o" and "watashi ni" of input sentence are exchanged to carry out conversion into "watashi ni soreo kudasai" so as to have ability to match with the template. This is the example where order exchange is carried out.

In accordance with the conversion rule of FIG. 5, as the order exchange rule, "X ga Y o" corresponds to "Y o X ga", "X ga Y ni" corresponds to "Y ni X ga", "X ga Y ni Z o" corresponds to X ga Z o Y ni", X ga Y ni Z o" corresponds to "Y ni X ga Z o", "X ga Y ni Z o" corresponds to "Y ni Z o X ga", X ga Y ni Z o corresponds to Z o X ga Y ni and "X ga Y ni Z o" corresponds to "Z o Y ni X ga".

Phrases which do not match with Japanese portion of the bilingual or equivalent template even if such conversions are implemented to inputted sentence or phrase are caused to undergo best matching by using suitable scale to allow user to make selection with respect to candidates of the rank N obtained as the result thereof, or to display message to the effect that "this input cannot be handled".

When representation of sentence inputted at the representation converting section 3 is converted, its result is presented to user to carry out confirmation/selection.

Namely, whether or not conversion result of the representation converting section 3 is in correspondence with intention of user is confirmed. In the case where plural conversion results are generated, these conversion results are presented to allow user to select conversion result that he intends.

As confirmation/selection, there are a method of carrying out such an operation every time the above-mentioned conversion rules are applied, a method of carrying out such an operation every time all the conversion rules are applied and a method of carrying out such an operation only once every time several conversion rules are applied, etc.

Among the representation conversion rules, there is rule such that meaning of the sentence is hardly changed like, e.g., order conversion rule. Such a rule may be applied after confirmation/selection by user is carried out to carry out re-conversion. Namely, in the case where the meaning of the sentence is hardly changed, re-conversion to carry out conversion for a second time can be made with respect to conversion candidates after confirmation/selection.

By adding processing of such re-conversion, confirmation/selection can be carried out by the same word order as that of input sentence to provide (present) sentence suitable for processing in translation processing.

Subsequently, explanation will be given by taking the example with respect to processing of representation conversion carried out at the representation converting section 3.

Figure 6:
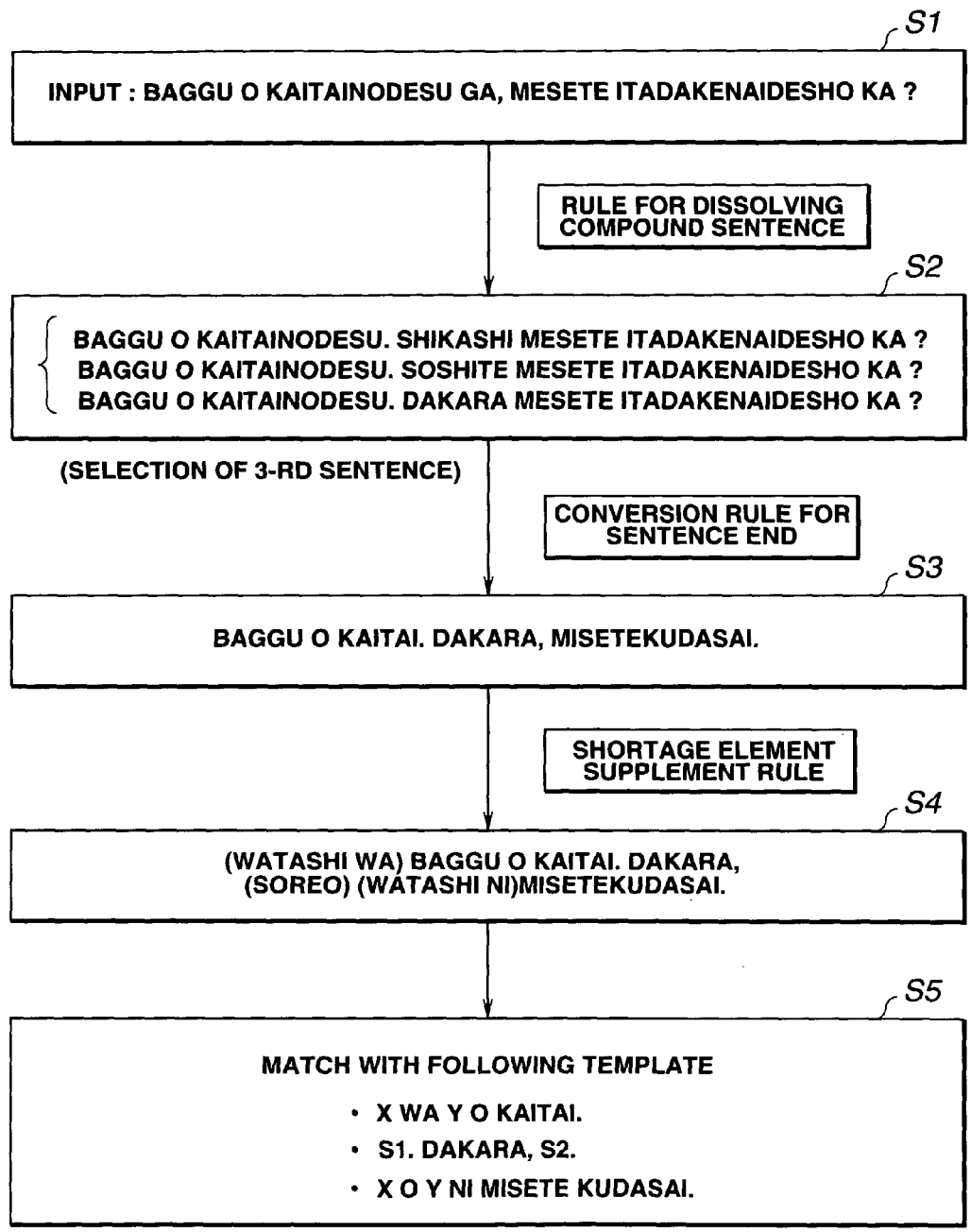
FIG. 6 is a view for explaining conversion result with respect to "Baggu o kaitainodesu ga, misete itadakenaide shoka?".

Conversion process when "baggu o kaitainodesuga, misete itadake naideshoka?" is inputted as example of the processing in this case is indicated with reference to FIG. 6. It is to be noted that while, in this example, it is assumed that confirmation/selection is carried out every time one conversion rule is applied, confirmation/selection may be made at other timings.

First, at step S1, input sentence of "Baggu o kaitainodesga, misete itadake naideshoka?" is sent from the control section 5 to the representation converting section 3.

At step S2, the representation conversion section 3 dissolves input sentence into two sentences by using the item of "~ga~" for dissolving compound sentence and univocal conjunction is supplemented. Since conjunction "ga" may be affirmative conjunction, negative conjunction, and reason (like conjunction indicating reason), three kinds of conjunctions "shikashi", "soshite" and "dakara" may be supplemented.

Thus, the input sentence is converted into three kinds of sentences "baggu o kaitainodesu. Shikashi misete itadakenaideshoka?", "baggu o kaitainodesu. Soshite, misete itadakenideshokat?" and "baggu o kaitainodesu. Dakara misete itadakenaideshoka?". These three kinds of sentences are presented on the display section 1.

From three kinds of sentences presented on the display section 1, the third sentence "baggu o kaitai nodesu. dakara, misete itadakenaideshoka?" is assumed to be selected.

At step S3, the representation converting section 3 applies sentence end conversion rule to the selected third sentence to carry out conversion so as to obtain representation which is simple and is in correspondence with intention of user. By application of the sentence end conversion rule, "~tai nodesu" is changed into "~tai", and "~te itadakenaide shoka?" is changed into "~de kudasai". Namely, the third sentence is converted into "baggu o kaitai₀ Dakara misete kudasai."

At step S4, the representation converting section 3 supplements element short in carrying out translation into English by using shortage element supplementary rule with respect to this sentence. By using the conversion rule shown in FIG. 5, "Watashi wa" is supplemented with respect to "baggu o kaitai", and "sore o" and "watashi ni" are supplemented with respect to "Misete kudasai.

At step S5, the representation converting section 3 converts input sentence into "(Watashi wa) baggu o kaitai Dakara (sore o) (watashi ni) misete kudasai.". Since this sentence is matched with the Japanese portion of the bilingual or equivalent template, translation can be made with higher accuracy as compared to the first input sentence.

In the above-mentioned example, since representation conversion is carried out within the original language, user can easily carry out confirmation/selection.

On the other hand, in the case where translation from Japanese to German is assumed, English-German translation has generally accuracy higher than Japanese-German translation in automatic translation by machine. Accordingly, in the case where user is also familiar with English in addition to Japanese, there can be also realized a system configuration to carry out conversion of representation by first carrying out translation from the Japanese to the English to allow user to confirm its result thereafter to translate it into German.

Figure 7:
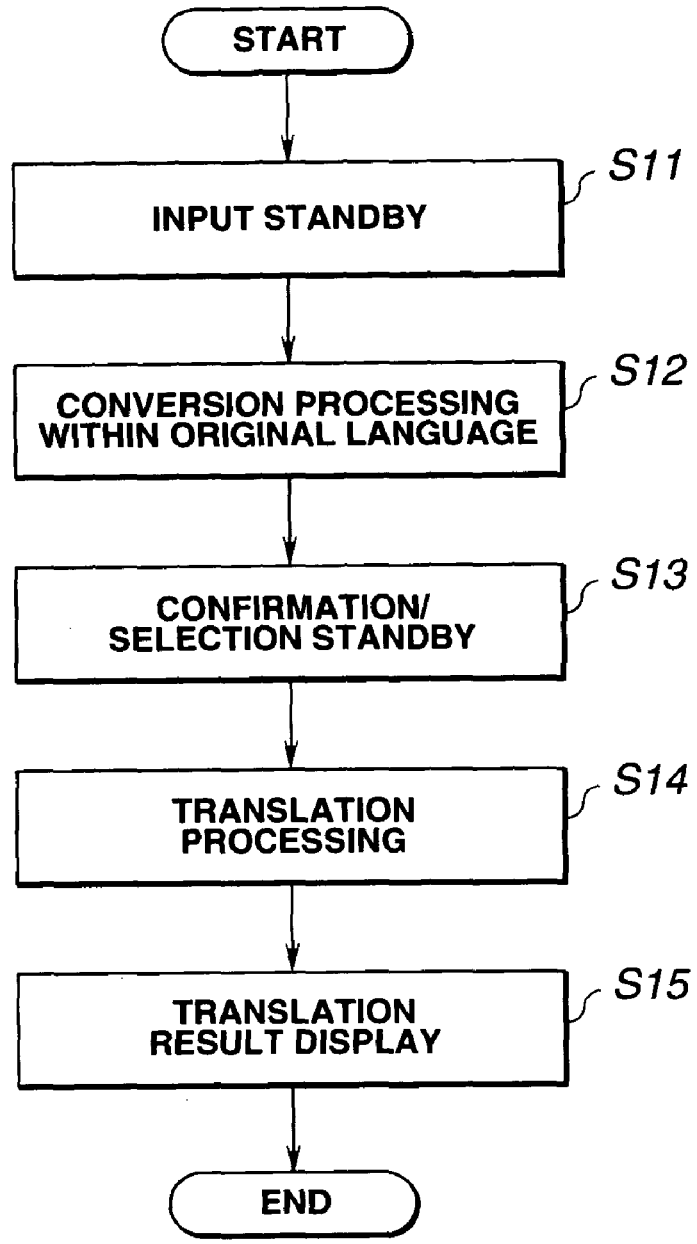
FIG. 7 is a flowchart showing steps of processing of translation unit.

Subsequently, processing process (steps) of machine transformation in the translation apparatus will be described with reference to the flowchart shown in FIG. 7.

At the first step S11, input waiting (standby) to wait for input of sentence by user to input section 2 is carried out. When sentence is inputted to the input section 2, the inputted sentence is transmitted to the representation converting section 3 by the control section 5.

At step S12, the representation converting section 3 converts the inputted sentence within original language. At the subsequent step S13, the sentence converted at the step S12 is displayed on the display section 1 to wait for standby input of confirmation/selection by user.

At step S14, translation processing is carried out, at the machine translation section 4, with respect to the sentence which has been caused to undergo confirmation/selection at the step S13. At the step S14, translation result is displayed on the display section 1. Thus, this processing procedure is completed.

As stated above, sentence that user has inputted is not caused to directly undergo natural language processing, machine translation processing in the case of the above-mentioned example, but "representation conversion processing" and "conformation/selection standby" are added therebetween.

The representation conversion processing converts input sentence into sentence close to intention of user, and converts it into sentence which can execute natural language processing subsequent thereto with good accuracy. Since this representation conversion processing is based on the premise that user is required to carry out confirmation/selection after representation conversion, it is sufficient that accuracy of conversion is not necessarily high, and plural conversion results are generated.

Figure 8:
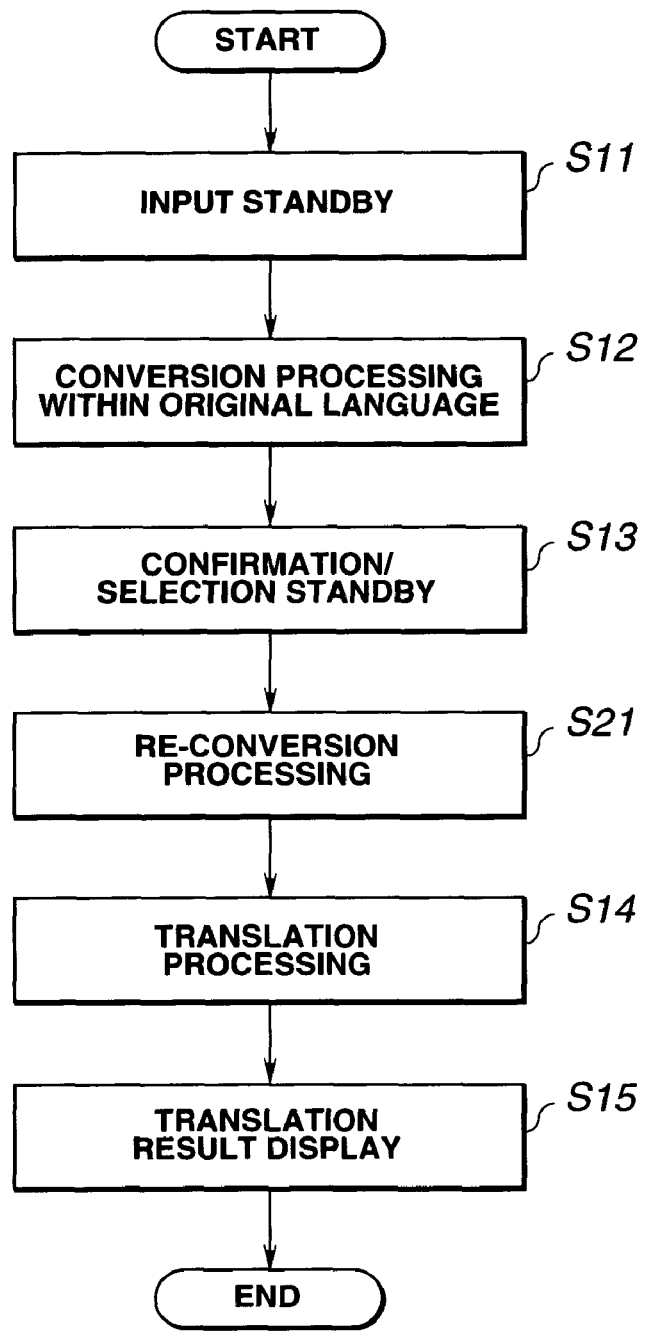
FIG. 8 shows steps of processing of the translation unit and a flowchart with re-conversion processing.

It is to be noted that, in the above-described processing steps, as shown in FIG. 8, re-conversion processing of step S21 may be carried subsequently of confirmation/selection standby of step S13 subsequent to conversion processing within original language of step S12. In this case, since other steps are the same as processing procedure shown in FIG. 7, the same reference numerals are respectively attached thereto.

As stated above, "re-conversion processing" may be added between "confirmation/selection standby" and "machine translation". In this processing, there is carried out only conversion to, e.g., exchange word order of a portion or the like which dose not change meaning or nuance of sentence within "representation conversion". By carrying out such a processing, sentence presented to user can be sentence relatively close to the input sentence and sentence delivered to translation processing can be sentence suitable for translation processing.

A voice translation apparatus (unit) which translates voice by utilizing natural language processing as a second embodiment of this invention will now be described.

First, the configuration of the voice translation unit will be described. It is to be noted that, for simplicity, the same reference numerals are respectively attached to the portions common to the above-described translation unit in the voice translation unit.

Figure 9:
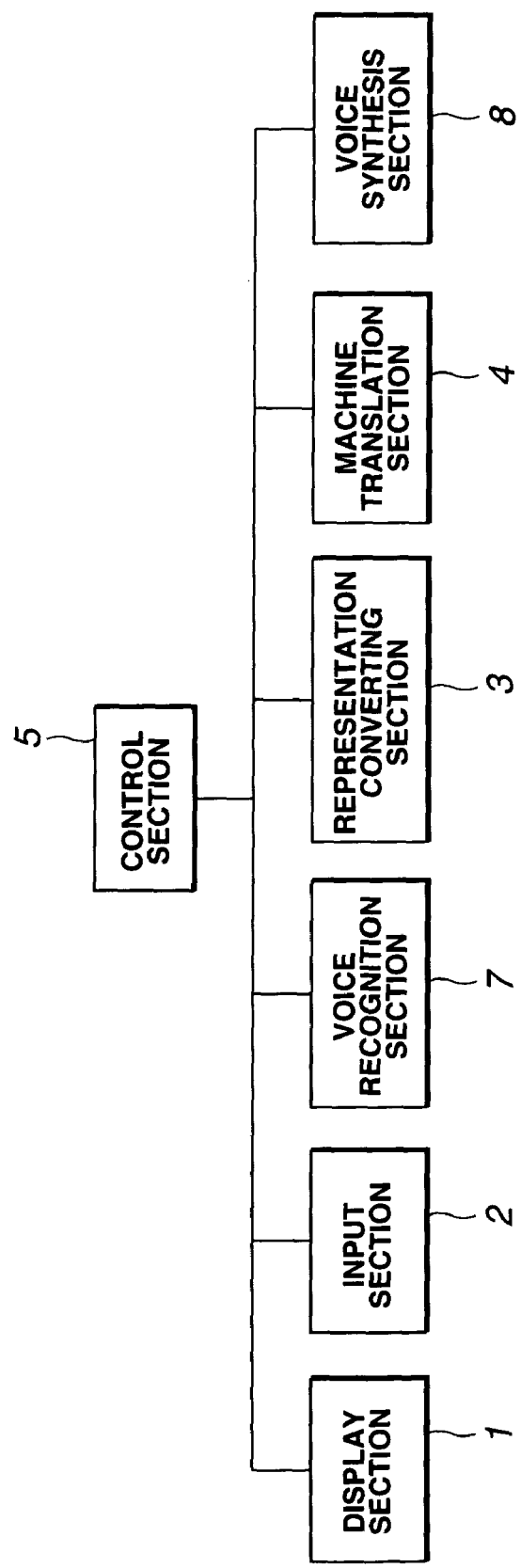
FIG. 9 is a block diagram showing outline of the configuration of voice translation unit.

The voice translation unit is composed of, as shown in FIG. 9, display section 1 for displaying various information, input section 2 for accepting input, representation converting section 3 for converting representation of sentence, machine translation section 4 for translating sentence, a voice recognition section 7 for carrying out recognition processing of voice, a voice synthesis section 8 for generating synthetic voice (sound) and. control section 5 for controlling respective components of this voice translation unit.

The display section 1 is comprised of, e.g., liquid crystal display, etc. The display section 1 carries out display of various information on the basis of command of the control section 5.

The input section 2 is comprised of, e.g., plural button switches or touch panels, etc. User utilize this input section to thereby carry out selection from information displayed on the display section 1 and/or selection of menu relating to the operation of the system, etc. The input section 2 transmits result of input by user to the control section 5.

The voice recognition section 7 is composed of, e.g., microphone, AD converter, arithmetic portion, memory portion, etc., and serves to input voice that user speaks by microphone to carry out AD conversion of inputted voice to digitize it to carry out recognition processing. Namely, the voice recognition section 7 recognizes the content which user speaks to output recognition result corresponding to the generated content to the control section.

The voice synthesis section 8 is composed of, e.g., arithmetic portion, memory portion, DA converter, speaker, etc.

The voice synthesis section 8 receives, from the control section 5, sentence translated at the machine translation section 3 to generate synthetic voice to output it from the speaker.

Figure 10:
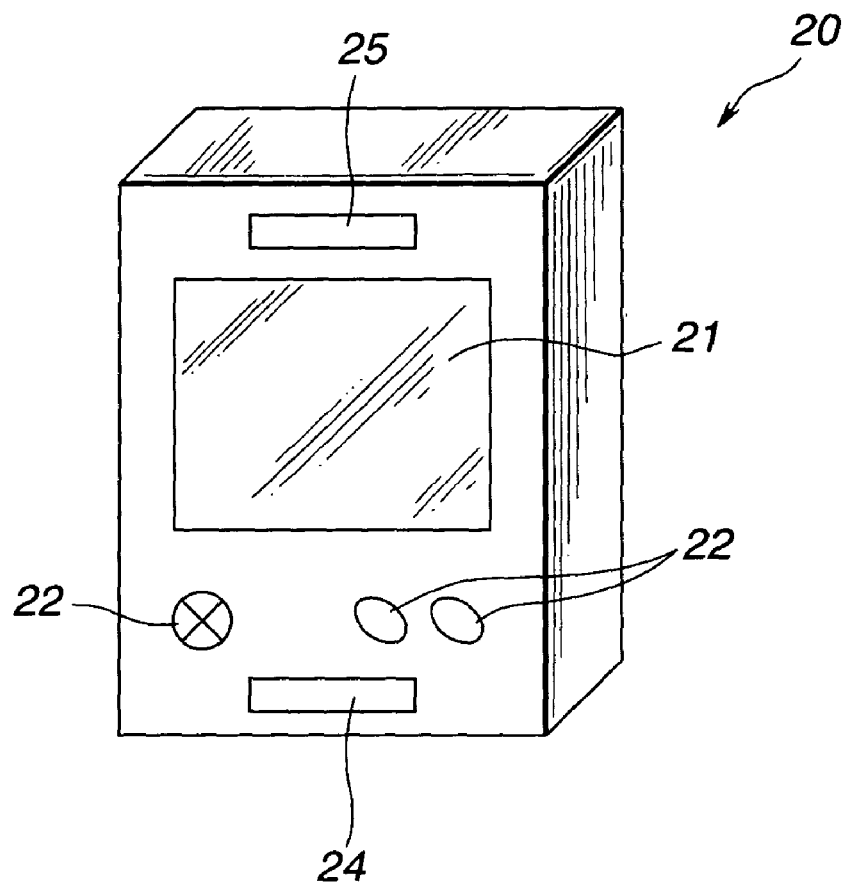
FIG. 10 is a perspective view showing appearance of the voice translation unit.

An example of appearance of the voice synthetic unit comprises, as shown in FIG. 10, on one principal surface of a substantially flat parallelepiped-shaped casing 20, a substantially rectangular liquid crystal display 21 serving as display section 1, various button switches 22 serving as input section 2, a microphone 24 for inputting voice to the voice recognition section 7, and a speaker 25 for outputting synthetic voice from voice synthesis section 8.

Figure 11:
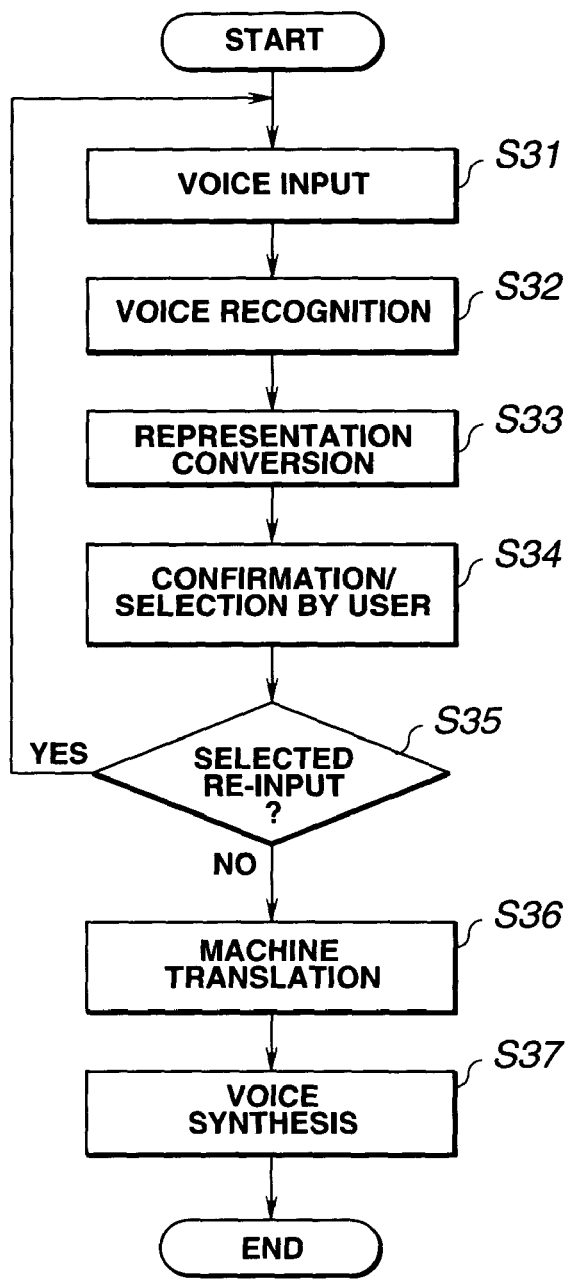
FIG. 11 is a flowchart showing steps of processing of the voice translation unit.

Subsequently, processing steps in the voice synthesis unit will be described with reference to the flowchart shown in FIG. 11.

As the processing procedure in the voice translation unit, an approach is assumed to be employed to input Japanese as original language by voice to translate it into English as objective language to output synthetic voice of English.

At the first step S31, user inputs sentence of the Japanese by voice. At the subsequent step S32, recognition processing is carried out at the voice recognition section 7.

At step S33, voice recognition result from the voice recognition section 7 is converted into another representation of the Japanese at the representation converting section 3. Further, at step S34, converted result is displayed on the display section 1. Thus, confirmation/selection by user is carried out. At this time, voice recognition result itself is not displayed on the display section 1, but another sentence indicating the same meaning content or intention is displayed thereon.

This processing is processing corresponding to the conversion within the original language in the above-described translation unit. This voice translation unit differs from the translation unit in that while processing is implemented to one input sentence in the translation unit, conversion processing is implemented to plural candidates obtained as voice recognition result.

At step S35, in the case where re-input is selected as the result of confirmation/selection by user at step S34, there results "YES". The processing returns to the step S31. In the case where re-input is not selected, there results "NO". Thus, the processing proceeds to step S36.

At the step S36, with the sentence that user has confirmed being as target (objective), machine translation conversion is carried out at the machine translation section 4. Thus, sentence of English is outputted. In this example, in the case where user selects re-input at this time, voice input is carried out for a second time. Finally, at step S37, voice synthesis is carried out at the voice synthesis section 8 on the basis of translation result of English outputted from the machine translation section 4. Thus, synthetic voice of English is outputted. This processing procedure is thus completed.

In this embodiment, the range is limited to the range where translation accuracy of language style handled in machine translation can be ensured. Further, inputs of various language styles obtained from voice recognition result are converted into representation by the language style within the range. Further, user is caused to confirm its content to allow him to confirm that the meaning content and/or intention are the same although representation is different in the sentence that user has inputted. Thus, such a sentence can be ensured as input.

In addition, in accordance with this embodiment, confirmation work of user can be one time of confirmation work while maintaining voice translation result of good accuracy.

Figure 12:
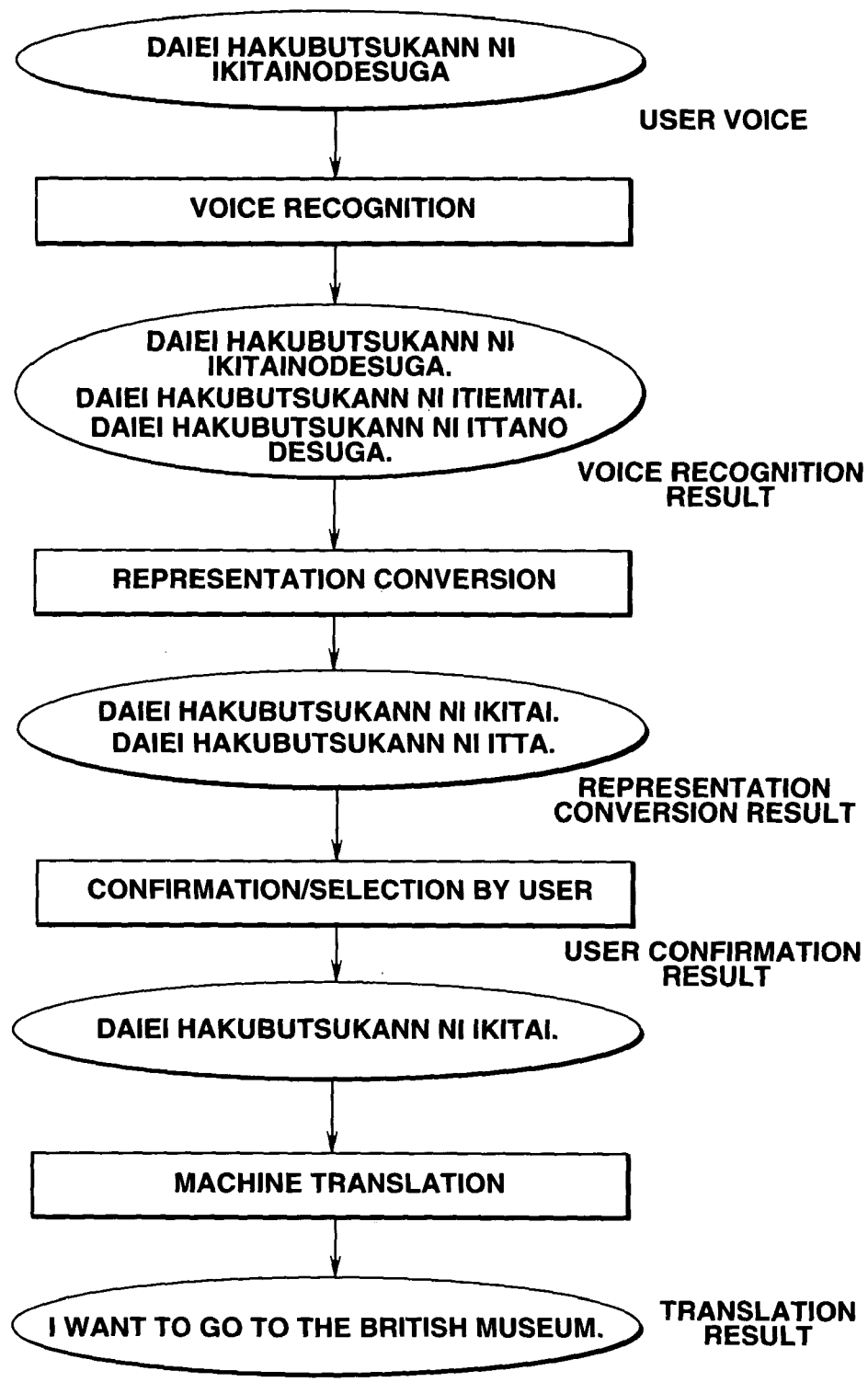
FIG. 12 is a view for explaining an example of processing in the voice translation unit.
Figure 14:
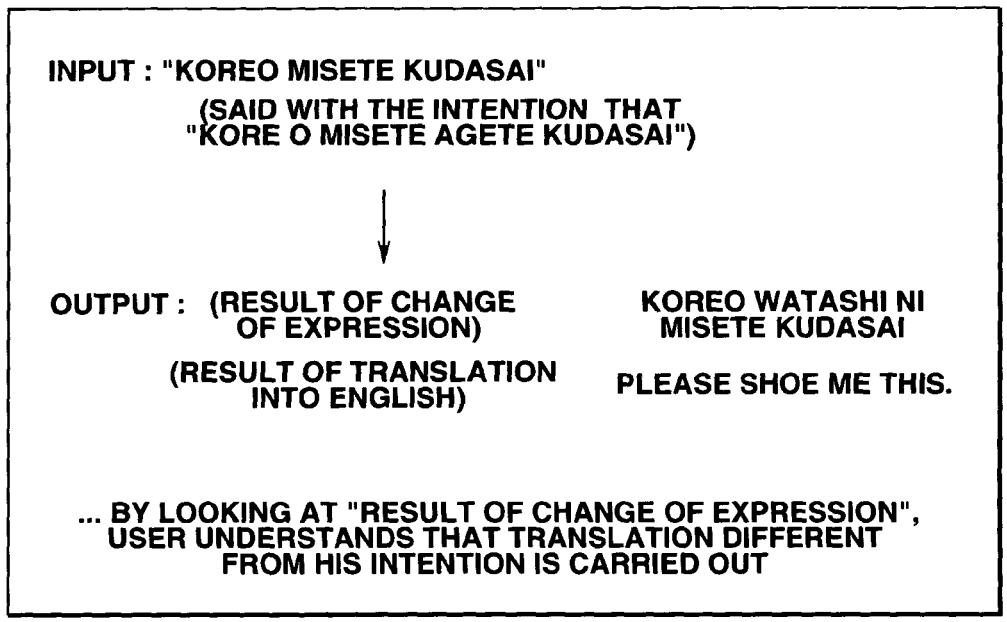
FIG. 14 is a view showing example of input and output.

A more practical example of processing in the voice translation unit will now be described with reference to FIG. 12.

First, conversation (speech or voice) of "Daiei Hakubutsu kan ni ikitai no desuga." is inputted from user to the voice translation unit. Such input is caused to undergo voice recognition processing at the voice recognition section 7. For example, the input is outputted in a form of plural sentence candidates having high recognition score as recognition result. In more practical sense, with respect to input such as kana, etc., three sentence candidates of "Daiei Hakubutsukan ni ikitainodesuga.", "Daiei Hakubutsukan ni ittemitai." and "Daiei Hakubutsukan ni itta no desuga" are outputted.

Then, representation conversion processing is carried out at the representation converting section 3 with respect to the voice recognition result thus obtained. In the case of this example, since "Daiei Hakubutsukan ni ikitaino desuga" and "Daiei hakubutsukan ni ittemitai" are very close to each other in the meaning, the input is converted into one representation of "Daiei Hakubutsukan ni ikitai. Further, "Daiei Hakubutsukan ni itta no desuga" is converted into "Daiei Hakubutsukan ni itta". These two sentences are displayed on the liquid crystal display of the display section 1.

User selects, at the input section 2, the sentence of "Daiei Hakubutsukan ni ikitai" as the sentence close to the meaning content and intention that he has said or uttered from the displayed sentences. Then, selected sentence is caused to undergo machine translation at the machine translation section 4 to thereby generate English sentence of "I want to go to the British museum." to voice-synthesize it at the voice synthesis section 8 to output voice of English.

It is to be noted that, in this embodiment, processing utilizing score may be further added.

Namely, in the voice recognition processing, in general, in the process for carrying out recognition processing by utilizing imbedded Markov model, etc., scores are given to candidates of recognition results to compare these values to thereby output most probable candidate as one or plural recognition results. In addition, in the representation conversion rule shown in FIG. 5, there is employed a technique to take statistic of the number of applications of rule on the basis of corpus data, etc, thereby making it possible to give score of application frequency to every rule.

Accordingly, in generating representation conversion result, suitable weighting operations are respectively implemented to these two scores to integrate such scores to thereby have ability to use them.

In this embodiment, in the voice translation unit in which voice recognition and machine translation are combined, confirmation in the voice recognition is postponed to merge or integrate it with confirmation of conversion result of the representation conversion processing to reduce the number of confirmation operations. However, this invention is not limited to such a combination.

For example, in the case of combination of kana-kanji conversion and information retrieval by natural language, there may be employed such a configuration to postpone result of kanji conversion with respect to kana input without confirming it to carry out such a representation conversion to directly extract key word from several kanji conversion candidates to present its result to user to allow him to carry out confirmation/selection. In addition, as processing of the succeeding stage, such an approach may be applied to representation support, etc.

A third embodiment of this invention will now be described.

In this embodiment, while the above-described translation unit is used, representation converting section 3 carries out only simple processing such as replacement/simplification of sentence end representation, etc., and machine translation section 4 also carries out conversion into another representation within original language in addition to conversion from original language to objective language.

While this embodiment does not depend upon the method of translation, explanation will be given by the system using bilingual (equivalent) template in the following description. In addition, original language is Japanese and objective language is English.

An example of equivalent or bilingual template is shown in FIG. 13. The equivalent or bilingual template also has the portion in which there is described the representation changed into another expression by original language which is "change of expression within the original language" in addition to the portion of the Japanese which is original language and the portion of the objective language obtained by translating the first-mentioned portion into English which is objective language.

In the equivalent or bilingual template, as polysemous change of expression, "Thank you" and "suimasen (arigatou)" correspond to "suimasen", "I'm sorry." and "suimasen (ayamaru)" correspond to "suimasen", "Excuse me." and suimasen (yobikake) correspond to "suimasen". "X use Y." and (no change of expression) correspond to "X ga Y o tsukau", "X go by Y" and "X ga Y de iku" correspond to "X ga Y o tsukau", and "X consume Y". and "X ga Y o shohi suru" corresponds to "X ga Y o tsukau".

Moreover, in the equivalent or bilingual template of FIG. 13, as shortage element supplement, "X use Y." and "watashi wa X o tsukau" correspond to "X o tsukau", "X go by Y" and "watashi wa X de iku" correspond to "X o tsukau", and "X consume Y." and "wata shi wa X o shohisuru" correspond to "X o tsukau".

Further, in the bilingual template shown in FIG. 13, as compound sentence development, "S1, but S2." and "S1, shikashi S2" correspond to "S1, ga, S2", "S1, but S2" and "S1, soshite S2" correspond to "S1 ga, S2", and "S1, but S2." and "S1○ S2" correspond to "S1 ga S2".

In the bilingual template of FIG. 13, the Japanese portion and English portion are similar to the example of the above-described bilingual template.

In this bilingual template, the portion of "change of expression within original language" is the portion in which representation having one-to-one correspondence with respect to the English portion is written by the Japanese. "Representation having one-to-one correspondence" is representation in which polysemy is lost by change of expression or comment, etc. in the case where the Japanese portion is polysemous, and/or representation obtained by supplementing shortage portion in the case where shortage element exists in the Japanese portion, etc.

For example, in FIG. 13, since "suimasen" of the Japanese portion is three kinds of polysemy, there exist three kinds of translations into English. In the "change of expression within original language", representations having no polysemy respectively corresponding thereto are described by Japanese. For example, "suimasen (=ayamaru)" is written for "I'm sorry", "suimasen (=arigato) is written for "Thank you", and "suimasen (=yobikake) is written for "Excuse me".

Moreover, in the case of translating, e.g., "X o misete kudasai" of the Japanese portion, phrase corresponding to "dareni", i.e., shortage element must be supplemented. If "watashi ni" is supplemented so that the English portion is "Please show me X.", "X o watashini misete kudasai" is written in the portion of "change of expression within the original language" so that "watashi o" is supplemented.

When there is subsequently input from user with respect to machine translation/change of expression processing, matching is taken between input and the Japanese portion of bilingual template. Moreover, change of expression such as sentence end representation, etc. can be made with respect to input before matching. By doing so, the number of templates can be reduced. As conversion of sentence end representation, e.g., conversion of input of "~Shimasu" into "~Suru" is mentioned.

When matching of the template is taken, translation into English is prepared in accordance with the template, and change of expression in Japanese is prepared. In the case where input is "koreo o misete kudasai", matching is taken with respect to template of FIG. 13, and translation into English and change of expression are prepared in accordance with the matching of the template. Here, it is assumed that translation is made with the intention of "kore o kare ni misete aget kudasai".

Further, result of change of expression of input "kore o watashi ni inisete kudasai", result of translation into English "Please show me this." and pair of translation into English and change of expression are presented to allow user to confirm them. In this case, only result of change of expression can be presented. User looks at the change of expression portion to confirm whether or not translation into English is correctly carried out.

By looking at the change of expression, user recognizes that translation that he does not intend is made to reject this conversion result.

Figure 15:
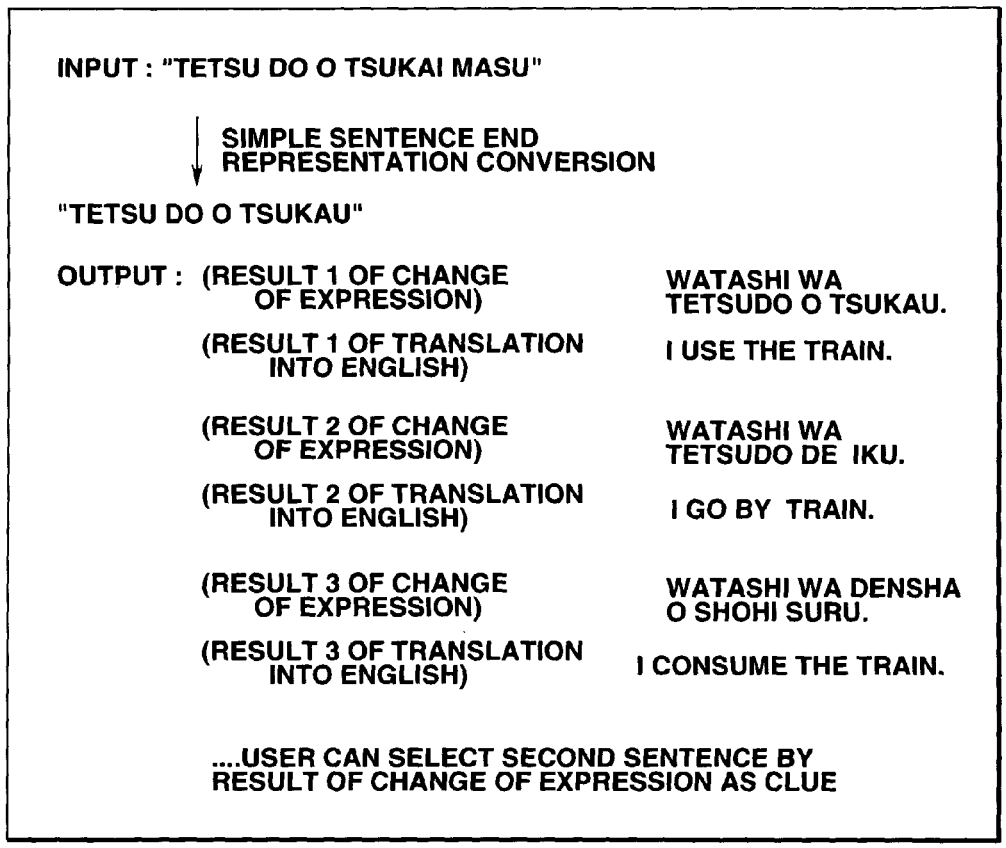
FIG. 15 is a view showing example of input and output.

In addition, in the case where input is "tetsudo o tsukau" as shown in FIG. 15, there are three kinds of templates matching with input in the bilingual template of FIG. 13. With respect to these respective templates, translations into English and changes of expression are generated. By presenting them, user is allowed to select optimum change of expression/translation into English.

In more practical sense, result of change of expression "watashi wa tetsudo o tsukau" and result of translation into English "I use the train.", result of change of expression "watashi wa tesudo de iku" and result of translation into English "I go by train.", and result of change of expression "watashi wa densha o shohi sum" and result of translation into English "I consume the train." are generated.

User can select the second result of change of expression "watashi wa tesudo de iku" and result of translation into English "I go by train." by the change of expression as clue.

It is to be noted that while, in the template system, restriction by meaning/attribute, etc. is provided, thereby making it possible to reducing the number of templates to be matched, there are instances where because the restriction is insufficient, plural templates may be matched. In this embodiment, even in such a case, user can select/confirm suitable translation result.

Further, this method of "simultaneously carrying out representation conversion and machine translation" has the merit that it is easy to take consistency even in the case where quantity of data is increased because data for representation conversion and data for machine translation exist at the same portion.

It is to be noted that this third embodiment can be realized by implementing the following modification to the first embodiment.

In the representation converting section 3 of the translation unit of the first embodiment, N best candidates are generated. At this stage, however, selection/confirmation are sent to the translation section 4 without carrying out selection/confirmation to postpone confirmation. By doing so, N number of candidates consisting of pairs of translation result and representation conversion result are generated. User carries out selection/confirmation with respect to these candidates.

A modified example as stated below is further indicated with respect to "machine translation carried out simultaneously with representation conversion", and explanation will be given.

When the portion of "change of expression within original language" of the conversion/translation template of FIG. 13 is viewed, there exist the portion in which expression is changed and the portion in which comment is merely supplemented.

When they are separated as shown in FIG. 16 to respectively describe "change of expression within the original language" and "comment" into different columns, this is advantageous both in processing and in preparation of template.

Namely, as the merit in processing, when "change of expression" and comment are separated, in the case where comment is merely supplemented without carrying out change of expression, discrimination may be easily made. In the case of only supplementing comment, simple processing is only required as compared to the case where change of expression is required.

As merits in preparing template, in the case where comment is only supplemented, labor required for description may be reduced.

Moreover, there are instances where circumstances in which suitable change of expression is not imagined in work, but only comment is attached may take place. When change of expression and comment are separated, it is easy to describe only comment for the time being in such a case, and to describe exchange of expression at the time when user notices later.

As the merit in expression, since comment and result of change of expression are separated, there are instances where comment and result of change of expression may be generated as the result of conversion within original language. Accordingly, it is possible to separately both comment and result of change of expression, whereby the degree of freedom of expression is improved.

As shown in FIG. 16, in the example of the template in which "change of expression" and comment are separately described, there exist blanks in the rows of "change of expression within the original language" and "comment". These blanks respectively represent that change of expression is not made and that comment is not supplemented.

For example, as compared to FIG. 13 with respect to change of expression of "suimasen", conversion into "suimasen (=ayamaru)" is made in FIG. 13, but comment of "expression at the time of apology" is instead supplemented without carrying out conversion in FIG. 16.

Namely, with respect to "suimasen (=ayamaru)", suimasen (=arigato)" and "suimasen (=yobikake)" which are polysemous change of expression of original language "suimasen" in FIG. 13, "representation in apology", "representation in thanks" and "representation in calling" respectively correspond to those representations as comments in FIG. 16, and the rows of change of expression within the original language become blank.

Changes of expression within the original language in FIG. 16 are the same with respect to original language "X ga Y o tsukau" and original language "X o tsukau" in FIG. 13, but comments rows are blank.

With respect to "S1. shikashi S2", "S1. Soshite S2" aired "S1$_\circ$ S2$_\circ$" which are compound sentence development of original language "S1 ga, S2" in FIG. 13, changes of expression within the original language in FIG. 16 are the same, but "expression in negative conjunction", "expression in affirmative conjunction" and "expression of parallel" respectively correspond thereto as the comment.

In processing within original language, "change of expression" and comment are separately generated. Then, at the stage of displaying conversion result/translation result, both expressions are displayed.

An example of output with respect to input is shown in FIG. 17. Since input is "suimasen", it is outputted in the state matched with 1, 2, 3 of the templates of FIG. 16.

Namely, with respect to 1 of FIG. 16, there result change of expression "suimasen", comment "representation at the time of apology", and translation into Fnglish "I'm sorry". With respect to 2 of FIG. 16, there result change of expression "suimasen", comment "representation of thanks" and translation into English "Thank you". With respect to 3 of FIG. 16, there result change of expression "suimasen", comment "representation in calling" and translation into English "Excuse me"

Another example of output with respect to input is shown in FIG. 18. Since input "~ga, ~", it matches with 11, 12, 13 of the templates of FIG. 16. In this case, "~" indicates any suitable difference.

Namely, with respect to 11 of FIG. 16, there result change of expression "~$_o$ shikashi~$_o$" comment "expression of negative conjunction" and translation into English "~, but~". With respect to 12 of FIG. 16, there result change of expression "~$_o$ soshite~$_o$", comment "expression of affirmative conjunction" and translation into English "~, and ~." With respect to 13 of FIG. 16, there result change of expression "~$_o$ soshite ~", comment "expression of parallel" and comment "~$_o$ ~$_o$"

In this case, "~" of translation into English is the portion in which "~" indicating the difference is translated into English.

While, in these FIGS. 17 and 18, "change of expression" and comment are displayed on separate items, this can be displayed in a manner of "change of expression (comment)" (e.g. excuse me (representation in apology))".

The reduction of the number of confirmations by execution in advance and postponement of confirmation will now be described.

The technique for reducing the number of confirmations can be applied not only to the voice translation apparatus (unit) but also to arbitrary natural language processing system having plural processes of "Processing→result confirmation".

As operation for reducing the number of confirmations, "execution in advance of confirmation" and "postponement of confirmation" as described below are defined.

The execution in advance of confirmation is operation to supplement, before first processing $P_1$, second processing $P_2$ for converting input into form which can process it with good accuracy at the first processing $P_1$ and second confirmation $C_2$ of result of the second processing $P_2$ to thereby omit the first confirmation $C_1$ after the first processing $P_1$.

The postponement of confirmation is operation to move first confirmation $C_1$ immediately after the first processing $P_1$ after the i-th processing Pi of the stage subsequent thereto, or the merge (integrate) the j-th confirmation Pj of the subsequent stage to thereby reduce the number of confirmations.

In this example, the confirmation referred to here is an operation such that in the case where plural processing results exist, i.e., plural selections exist, user selects suitable one therefrom. If selections are not all suitable, user selects "no correct solution".

In addition, in the case where one processing result exists, the confirmation has the meaning that user confirms whether or not one processing result is correct solution. Also in the following description, confirmation is assumed to be used in the same meaning.

First, "execution in advance of confirmation" will be described. Execution in advance of confirmation is applied to system having at least one set of processing and confirmation.

Figure 19A:
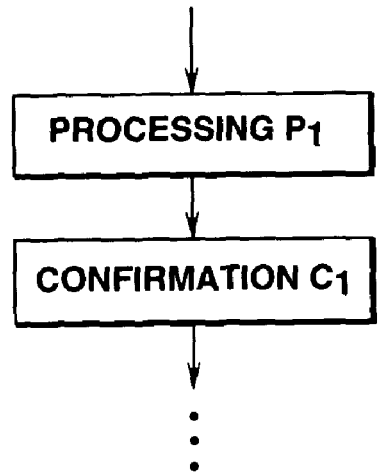
FIG. 19A is a view showing the state before execution in advance of confirmation is applied.

For example, in the state before execution in advance of confirmation shown in FIG. 19A is applied, first processing $P_1$ and first confirmation $C_1$ with respect thereto are indicated.

Figure 19B:
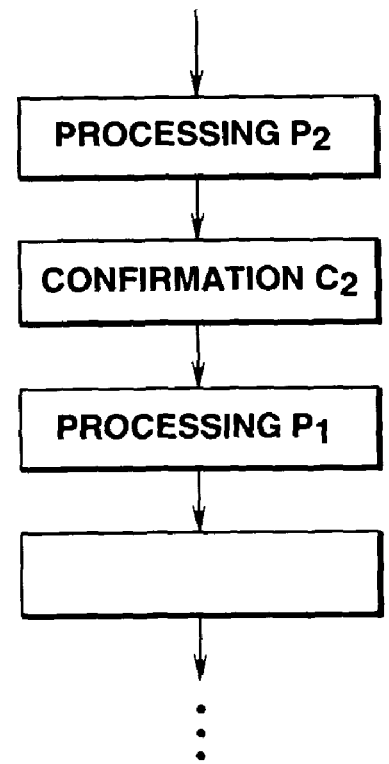
FIG. 19B is a view showing the state after execution in advance of confirmation is applied.

In order to apply execution in advance of confirmation thereto, as shown in the state after application of FIG. 19B is applied, second processing $P_2$ and second confirmation $C_2$ for confirming the result are supplemented before the first processing $P_1$ to instead delete the first confirmation $C_1$ for confirming result of the first processing $P_1$. In this case, box of blank in the figure indicates first confirmation $C_1$ thus deleted.

The second processing $P_2$ is processing for converting input into form which can process it with good accuracy at the first processing $P_1$, and its processing content depends upon the first processing $P_1$.

For example, in the system "before application" of execution in advance of confirmation, since polysemy is included in the input, there are instances where confirmation is required after processing (or processing accuracy is lowered). In such a case, the second processing $P_2$ required for execution in advance of confinnation results in the processing in which input is developed by the number of polysemous expressions.

With respect to processing such as "polysemous expression rule" or "compound sentence dissolution rule" shown in FIG. 5, for example, in the second processing $P_2$, there is carried out processing to develop input by the number of polysemous expressions.

By this execution in advance, even in the processing in which user is difficult to confirm result (e.g., machine translation), it becomes possible to confirm it before processing. Thus, confirmation after processing becomes unnecessary.

"Postponement of confirmation" will now be described. Postponement of conformation is applied to the system having at least two sets of processing and confirmations.

Figure 20A:
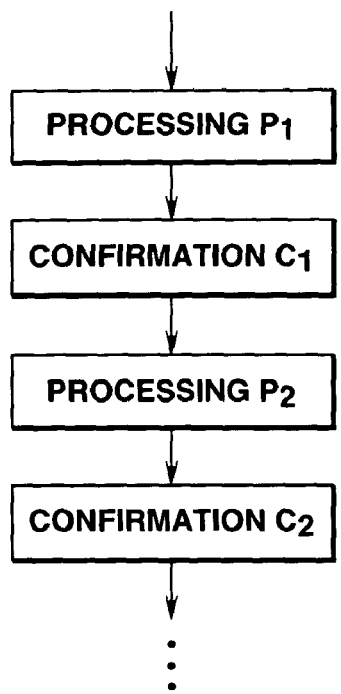
FIG. 20A is a view showing the state before postponement of confirmation is applied.

For example, in the state before postponement of confirmation shown in FIG. 20A is applied, there are indicated first processing $P_1$ and first confirmation $C_1$ of the preceding stage and second processing $P_2$ and second confirmation $C_2$ of the succeeding stage.

Figure 20B:
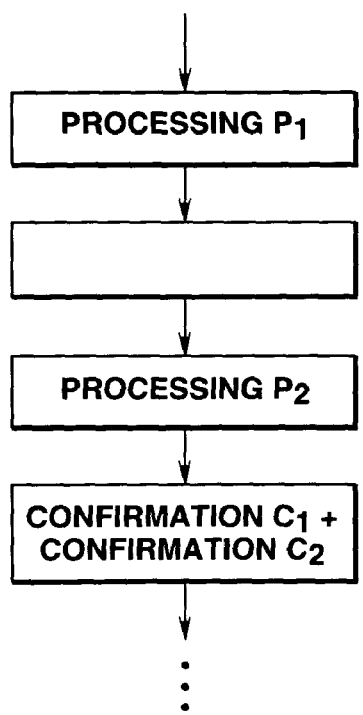
FIG. 20B is a view showing the state after postponement of confirmation is applied.

In order to apply postponement of confirmation thereto, as shown in the state after applied of FIG. 20B, the first confirmation $C_1$ for confirming result of the first processing $P_1$ of the preceding stage is moved to the portion after the second processing $P_2$ of the succeeding stage, or merger (integration) with the second confirmation $C_2$ of the processing of the succeeding stage is carried out to allow it to be single confirmation. In this example, box of blank in the figure indicates the deleted first confirmation $C_1$.

In the case where there are plural output results of the first processing $P_1$, all of those results are provided with respect to the second processing $P_2$ and results provided from the first processing $P_1$ are processed one by one in the second processing $P_2$. Further, user confirms its result.

Combination of execution in advance and postponement of confirmation will now be described. Combination of execution in advance and postponement is applied to the system having two sets of processing and confirmations of its result.

Figure 21A:
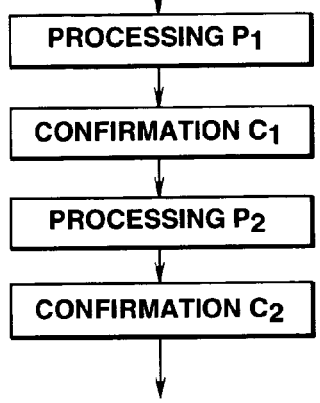
FIG. 21A is a view showing the state before execution in advance and postponement are applied.

For example, in the state before combination of execution in advance and postponement of confirmation of FIG. 21A is not applied, there are indicated first processing $P_1$, first confirmation $C_1$, second processing $P_2$ and second confirmation $C_2$.

Figure 21B:
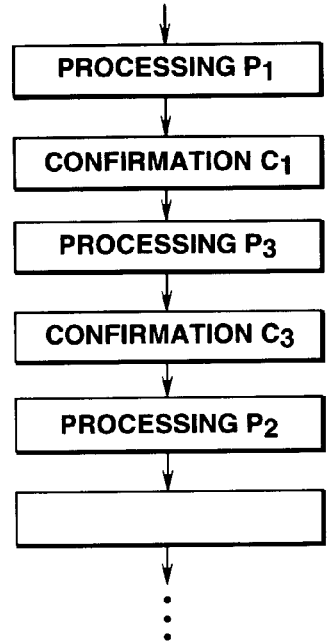
FIG. 21B is a view showing the state after execution in advance is applied.
Figure 21C:
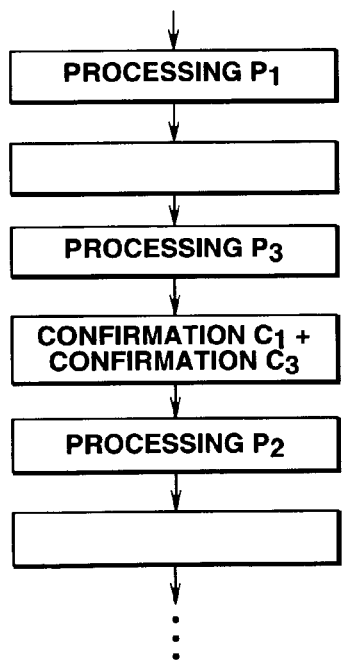
FIG. 21C is a view showing the state after execution in advance and postponement are applied.

When execution in advance is applied to the second confirmation $C_2$, there results a form as shown in FIG. 21B. Namely, third processing $P_3$ is supplemented before the second processing $P_2$ as "processing for converting input into form which can process it with good accuracy by the second processing $P_2$", third confirmation $C_3$ for confirming result of the third processing $P_3$ is also supplemented, and the second confirmation $C_2$ is deleted. Box of blank in the figure indicates the deleted second confirmation $C_2$.

Then, when postponement is applied to the first confirmation $C_1$ in the state where execution in advance is applied to the second confirmation $C_2$ shown in FIG. 21B, the first confirmation $C_1$ is merged (integrated) with the third confirmation $C_3$ after the third processing $P_3$. In this way, the number of confirmations is reduced from two times to one time. Box of blank in the figure indicates position of the moved first confirmation $C_1$.

Moreover, in this embodiment, since the processing are continuous in a manner of "→first processing $P_1$→third processing $P_3$", such processing may be replaced by processing in which two processing are merged or integrated.

It may be difficult for user to confirm processing result in dependency upon the content of the second processing $P_2$. For this processing, there are instances where, e.g., the second processing $P_2$ is translation processing.

Even if postponement is merely applied to such a system to merge or integrate confirmation, since confrmation remains to be difficult, integration (merger) is of no sense. However, when execution in advance and postponement are combined as in this embodiment, since confirmation is made before the second processing $P_2$, confirmation is easy. It is meaningful to carry out integration (merger).

A more practical example in which "execution in advance" and "postponement" of confirmation will now be described.

Figure 22A:
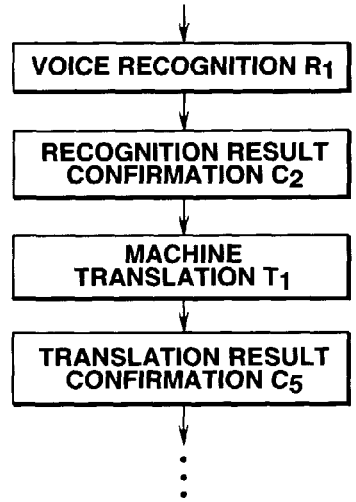
FIG. 22A is a view showing voice translation.

A conventional voice translation system has a mode as shown in FIG. 22A. Namely, processing is carried out in order of voice translation $R_1$, recognition result confirmation $C_4$, machine translation $T_1$, and translation result confirmation $C_5$.

In the conventional voice translation system shown in FIG. 22A, execution in advance is applied to "translation result confirmation $C_5$". Namely, as shown in FIG. 22B, as "processing for converting input into form which can process it with good accuracy", representation conversion processing $T_2$ and conversion result confirmation $C_6$ for confirming its result are supplemented before the machine conversion processing $T_1$ and the translation result confirmation $C_5$ is instead deleted.

Here, when compared to FIG. 21B, representation conversion $T_2$ corresponds to second processing $C_2$ and conversion result confirmation $C_6$ corresponds to third confirmation $C_3$. In addition, box of blank in the figure indicates deleted translation result confirmation $C_5$.

Figure 22B:
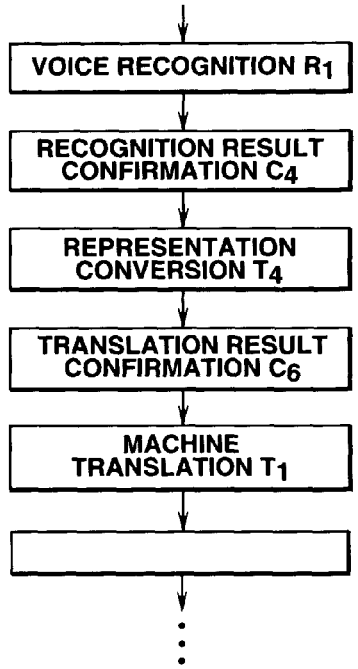
FIG. 22B is a view in which execution in advance is applied to FIG. 22A.
Figure 22C:
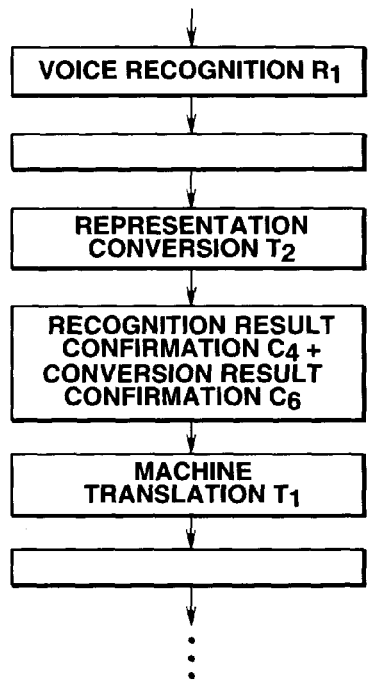
FIG. 22C is a view in which postponement is applied to FIG. 22B.

In the state where execution in advance is applied to the recognition result confirmation $C_4$ shown in FIG. 22B, postponement is applied to the "recognition result confirmation $C_4$" as shown in FIG. 22C. Namely, the "recognition result confirmation $C_4$" is moved to the portion after "representation conversion $T_2$" to integrate (merge) it with "conversion result confirmation $C_6$" to allow it to be single confirmation. This corresponds to the second form of the embodiment.

In this case, box of blank subsequent (succeeding) to voice recognition $R_1$ indicates position where the moved recognition result confirmation $C_4$ exists.

Figure 22D:
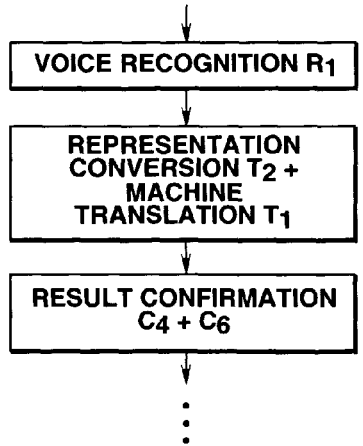
FIG. 22D is a view in which postponement and merger (integration) are applied to FIG. 22C.

When postponement is further applied thereto, representation conversion and machine translation can be carried out at the same time as shown in FIG. 22D. Namely, postponement is applied to "recognition result confirmation $C_4$+conversion result confirmation $C_6$" shown in FIG. 22C to move it to the portion after machine translation processing $T_1$. Thus, two processing are continuous in a manner of "→representation conversion $T_2$→machine translation $T_1$", such a processing can be replaced by the processing where both operations are integrated or merged (processing for simultaneously carrying out representation conversion and machine translation).

Output of the processing of "representation conversion $T_2$+machine translation $T_1$" includes both conversion result in the original language and translation result into objective language. For this reason, it is easy for user to confirm processing result unlike confirmation of translation result in the conventional method.

As described above, in the above-described embodiment, inputted natural language is converted into another representation to allow user to carry out selection/confirmation thereafter to carry out processing. Further, when there are plural natural language processing and confirmations of results, execution in advance and postponement of confirmation are carried out to thereby reduce the number of confirmations of user. Namely, there is employed such an approach to convert, before a certain processing, input into a form which can process it with good accuracy by the above-mentioned processing to supplement confirmation of its conversion result to thereby integrate (merge) execution in advance of confirmation which omits confirmation of the processing and confirmation immediately after a certain processing with confirmation of processing for execution in advance of confirmation introduced at the stage subsequent or succeeding thereto, thus to carry out postponement of confirmation which reduces the number of confirmations.

As described above, in this invention, such an approach is employed to convert input into representation every one of the inputs to present it to user to carry out selection/confirmation. Accordingly, there can be provided natural language processing in which confirmation operation by user is as minimum as possible and having high accuracy.

In accordance with this invention, there can be provided such a natural language processing apparatus capable of obtaining output result guaranteed from a viewpoint of accuracy in a form as close as possible to a desired output by confirmation operations as lesser as possible.

In addition, since selection/confirmation of translation word is substantially impossible in the conventional translation, if accuracy of the translation unit is not caused to be high, i.e., only one correct solution is outputted, translation was not practical. On the contrary, since translation is permitted to correspond to selection/confirmation of translation result in the translation of this invention, translation is practical even if accuracy of translation unit is not so high.

The invention claimed is:

1. A natural language processing apparatus comprising:
   a processor;
   an input device; and
   a memory device storing instructions which when executed by the processor, cause the processor to operate with the input device to:
   (a) input a first natural language;
   (b) convert the first natural language into a plurality of representations within the first natural language, the plurality of representations replacing postpositional words of the first natural language;
   (c) confirm at least one of the converted representations as being closest in meaning to the inputted first natural language, the confirmed representation being unmatched to any first attributes of a template table such that the confirmed representation is unsuitable for translation;
(d) re-convert the confirmed at least one representation to a re-converted representation within the same first natural language by exchanging word order of the at least one representation, the re-converted representation matching at least one of the first attributes of the template table such that the re-converted representation is suitable for translation;
(e) translate the re-converted representation to a second natural language; and
(f) output the second natural language.

2. The natural language processing apparatus of claim 1, wherein the instructions, when executed by the processor, cause the processor to convert the first natural language.

3. The natural language processing apparatus of claim 1, wherein the instructions, when executed by the processor, cause the processor to convert plural representations into single representation with respect to representation of inputted natural language.

4. The natural language processing apparatus of claim 1, wherein the instructions, when executed by the processor, cause the processor to convert polysemous representation into plural univocal representations with respect to representation of inputted natural language.

5. The natural language processing apparatus of claim 1, wherein the instructions, when executed by the processor, cause the processor to carry out conversion by at least one of merger (integration), division, deletion, replacement and exchange of order with respect to representation of inputted natural language.

6. The natural language processing apparatus of claim 1, wherein the input device is configured to input natural language using voice.

7. The natural language processing apparatus of claim 6, wherein the instructions, when executed by the processor, cause the processor to confirm, only once, natural language inputted by voice to the input device.

8. The natural language processing apparatus of clam 1, wherein the input device is configured to input natural language using a character.

9. The natural language processing apparatus of claim 8, wherein the instructions, when executed by the processor, cause the processor to confirm, only once, natural language inputted by the character at the input device.

10. The natural language processing apparatus of claim 1, wherein the instructions, when executed by the processor, cause the processor to:
(a) convert first language inputted via the input device into a second representation of the second language;
(b) convert the first language into a first representation of the first language having one-to-one correspondence with respect to the second representation; and
(c) carry out confirmation by using the first representation.

11. The natural language processing apparatus of claim 10, wherein the instructions, when executed by the processor, cause the processor to:
(a) translate the first natural language into the second language based on conversion and confirmation;
(b) output the translated second language.

12. The natural language processing apparatus of claim 1, wherein the re-converted representation has the same meaning as the at least one representation.

13. A natural language processing apparatus comprising:
an input device;
a first processor;
a second processor; and
a memory device storing instructions which when executed by the first processor, cause the first processor to operate with the input device and the second processor to:
(a) input a natural language;
(b) convert the inputted natural language into a plurality of representations of the natural language;
(c) confirm at least one representation being closest in meaning to the inputted natural language, the confirmed representation being unmatched to any first attributes of a template table such that the confirmed representation is unsuitable for translation;
(d) re convert the plurality of confirmed representations into a plurality of re-converted representations of the natural language by exchanging word order within the plurality of representations, the re-converted representations matching at least one of the first attributes of the template table such that the re-converted representations are suitable for translation; and
(e) output the natural language, wherein the second processor is configured to convert the natural language and confirm the results of the converted natural language at a stage preceding a first processing means to thereby carry out execution in advance of confirmation of the first processing means to delete confirmation of result of the first processing means.

14. The natural language processing apparatus of claim 13, wherein processing by the first processing means is machine translation processing, kana-kanji conversion processing, information retrieval processing by natural language, or representation conversion processing by natural language.

15. The natural language processing apparatus of claim 13, wherein processing by the second processor is machine translation processing, kana-kanji conversion processing, information retrieval processing by natural language, or representation conversion processing by natural language.

16. The natural language processing apparatus of claim 13, further comprising, at a stage preceding the second processing means, a third processing means and third confirmation means for confirming result thereof, wherein the third confirmation means is coupled to the portion after the second or subsequent processing means, or wherein the third confirmation means is merged or integrated into the second confirmation means or confirmation means of the stage succeeding thereto to thereby carry out postponement of confirmation.

17. The natural language processing apparatus of claim 16, wherein means in which the second confirmation means and the third confirmation means are merged or integrated gives result of processing as numeric value to present the numeric value.

18. The natural language processing apparatus of claim 16, wherein the first processing means carries out machine translation and the third processing means carries out voice recognition.

19. The natural language processing apparatus of claim 16, the instructions, when executed by the first processor, cause the first processor to:
(a) carry out voice recognition of the inputted natural language;
(b) confirm a voice recognition result;
(c) implement machine translation to the confirmed voice recognition result; and
(d) confirm a machine translation result, wherein representation conversion processing means for converting representation and representation conversion confirming means for confirming result of the conversion thereof are supplemented at a preceding stage of the machine translation to thereby carry out execution in advance of the confirmation of the machine translation result to omit the translation result confirming of the stage succeeding to the machine translation implementation.

20. The natural language processing apparatus of claim 19, wherein postponement of processing by the recognition result confirming means which merges or integrates the recognition result confirmation result with the representation conversion result confirming means existing at the stage succeeding thereto is carried out.

21. The natural language processing apparatus of claim 13, wherein the plurality of re-converted representations have the same meaning as the plurality of representations.

22. A method of operating a natural language processing apparatus including instructions, the method comprising:
 (a) causing a processor to execute the instructions to operate with an input device to input a first natural language;
 (b) causing the processor to execute the instructions to convert the first natural language into:
  (i) a plurality of representations within the first natural language;
  (ii) a second representation of a second language; and
  (iii) a first representation of the first natural language having one-to-one correspondence with respect to the second representation, the plurality of at least another representation replacing postpositional words of the first natural language;
 (c) causing the processor to execute the instructions to confirm the converted first natural language as being closest in meaning to the inputted first natural language, the confirmed representation being unmatched to any first attributes of a template table such that the confirmed representation is unsuitable for translation;
 (d) causing the processor to execute the instructions to re-convert the converted first natural language to a re-converted representation within the first natural language by exchanging word order of the first natural language, the re-converted representation matching at least one of the first attributes of the template table such that the re-converted representation is suitable for translation;
 (e) causing the processor to execute the instructions to translate the re-converted first natural language to a second natural language; and
 (f) causing a display device to display the second natural language.

23. The method of claim 22, wherein the first natural language re-converted at the reconverting step has the same meaning as the first natural language converted at the conversion step.

24. A method of operating a natural language processing apparatus including instructions, the method comprising:
 (a) causing a processor to execute the instructions to operate with an input device to input a natural language;
 (b) causing the processor to execute the instructions to convert the inputted natural language into a plurality of representations of the natural language;
 (c) causing the processor to execute the instructions to confirm at least one representation closest in meaning to the inputted natural language, the confirmed representation being unmatched to any, first attributes of a template table such that the confirmed representation is unsuitable for translation;
 (d) causing the processor to execute the instructions to re-convert the plurality of confirmed representations into a plurality of re-converted representations of the natural language by exchanging word order within the plurality of representations, the re-converted representations matching at least one of the first attributes of the template table such that the re-converted representations are suitable for translation; and
 (e) thereafter, causing a display device to display the processed natural language, wherein a second processing step of converting the natural language and a second confirmation step of confirming result of the second processing step are provided at a stage preceding a first processing step to thereby carry out execution in advance of confirmation of the first processing step to delete confirmation of result of the first processing step.

25. The method of claim 24, wherein the plurality of re-converted representations have the same meaning as the plurality of representations,

\* \* \* \* \*